(12) United States Patent
Guard

(10) Patent No.: US 9,285,942 B1
(45) Date of Patent: Mar. 15, 2016

(54) OPTICAL-BAND VISIBILITY FOR TOUCH-SENSOR MESH DESIGNS

(71) Applicant: David Brent Guard, Southampton (GB)

(72) Inventor: David Brent Guard, Southampton (GB)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/525,114

(22) Filed: Oct. 27, 2014

(51) Int. Cl.
    *G06F 3/045*    (2006.01)
    *G06F 3/047*    (2006.01)
    *G06F 3/041*    (2006.01)
    *G06F 3/044*    (2006.01)

(52) U.S. Cl.
    CPC ............... *G06F 3/047* (2013.01); *G06F 3/044* (2013.01); *G06F 3/0412* (2013.01); *G06F 2203/04101* (2013.01); *G06F 2203/04111* (2013.01); *G06F 2203/04112* (2013.01)

(58) Field of Classification Search
    CPC ........ G06F 3/044; G06F 3/045; G06F 3/0412
    USPC ................... 345/173–179; 178/18.01–18.04; 73/725, 862.046
    See application file for complete search history.

(56) References Cited

U.S. PATENT DOCUMENTS

| 5,329,577 | A  | 7/1994  | Norimatsu |
| 6,262,704 | B1 | 7/2001  | Kurumisawa |
| 6,781,647 | B2 | 8/2004  | Fujieda |
| 7,663,607 | B2 | 2/2010  | Hotelling |
| 7,864,503 | B2 | 1/2011  | Chang |
| 7,875,814 | B2 | 1/2011  | Chen |
| 7,920,129 | B2 | 4/2011  | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012  | Frey |
| 8,217,902 | B2 | 7/2012  | Chang |
| 8,493,347 | B2 | 7/2013  | Chen |
| 8,519,967 | B2 | 8/2013  | Chien |
| 8,591,279 | B1 | 11/2013 | Cok |
| 8,692,795 | B1 | 4/2014  | Kremin |
| 8,692,802 | B1 | 4/2014  | Maharyta |
| 8,698,767 | B2 | 4/2014  | Kwak |
| 8,711,292 | B2 | 4/2014  | Guard |
| 8,723,824 | B2 | 5/2014  | Myers |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.

(Continued)

*Primary Examiner* — Kimnhung Nguyen
(74) *Attorney, Agent, or Firm* — Baker Botts L.L.P.

(57) ABSTRACT

In one embodiment, an apparatus includes a touch sensor that includes a mesh of conductive material configured to extend across a display. The mesh includes first lines of conductive material that are substantially parallel to each other and second lines of conductive material that are substantially parallel to each other. The first lines extend across the display at a first angle relative to a first axis, and the second lines extend across the display at a second angle relative to the first axis. First lines that are adjacent to each other are separated from each other along the first axis by a first separation distance, and second lines that are adjacent to each other are separated from each other along the first axis by a second separation distance.

20 Claims, 15 Drawing Sheets

(56) References Cited

U.S. PATENT DOCUMENTS

| | | | |
|---|---|---|---|
| 8,736,571 | B1 | 5/2014 | Guard |
| 8,797,285 | B2 | 8/2014 | Guard |
| 8,896,573 | B1 | 11/2014 | Guard |
| 8,943,903 | B1 | 2/2015 | Guard |
| 8,947,390 | B1 | 2/2015 | Guard |
| 8,947,391 | B1 | 2/2015 | Guard |
| 8,963,561 | B2 * | 2/2015 | Yilmaz ................ G06F 3/044 324/649 |
| 2001/0035924 | A1 | 11/2001 | Fujieda |
| 2005/0259082 | A1 | 11/2005 | Potsch |
| 2007/0030222 | A1 | 2/2007 | Lee |
| 2008/0036853 | A1 | 2/2008 | Shestak |
| 2008/0239356 | A1 | 10/2008 | Nakano |
| 2008/0309635 | A1 | 12/2008 | Matsuo |
| 2009/0218310 | A1 | 9/2009 | Zhu |
| 2009/0219258 | A1 * | 9/2009 | Geaghan ................ G06F 3/044 345/173 |
| 2009/0273577 | A1 | 11/2009 | Chen |
| 2009/0315854 | A1 | 12/2009 | Matsuo |
| 2010/0079384 | A1 | 4/2010 | Grivna |
| 2010/0149117 | A1 | 6/2010 | Chien |
| 2010/0156769 | A1 | 6/2010 | Chang |
| 2010/0156840 | A1 * | 6/2010 | Frey ................ G06F 3/044 345/174 |
| 2010/0194697 | A1 | 8/2010 | Hotelling |
| 2010/0302201 | A1 | 12/2010 | Ritter |
| 2011/0148781 | A1 | 6/2011 | Chen |
| 2011/0157102 | A1 | 6/2011 | Ando |
| 2011/0242028 | A1 | 10/2011 | Lee |
| 2011/0291966 | A1 | 12/2011 | Takao |
| 2012/0013546 | A1 | 1/2012 | Westhues |
| 2012/0031746 | A1 | 2/2012 | Hwang |
| 2012/0044165 | A1 | 2/2012 | Kwak |
| 2012/0242588 | A1 | 9/2012 | Myers |
| 2012/0242592 | A1 | 9/2012 | Rothkopf |
| 2012/0242606 | A1 | 9/2012 | Mackey |
| 2012/0243151 | A1 | 9/2012 | Lynch |
| 2012/0243719 | A1 | 9/2012 | Franklin |
| 2012/0262382 | A1 | 10/2012 | Guard |
| 2012/0262412 | A1 | 10/2012 | Guard |
| 2012/0313880 | A1 | 12/2012 | Geaghan |
| 2013/0076612 | A1 | 3/2013 | Myers |
| 2013/0100054 | A1 | 4/2013 | Philipp |
| 2013/0127739 | A1 | 5/2013 | Guard |
| 2013/0127769 | A1 | 5/2013 | Guard |
| 2013/0127771 | A1 | 5/2013 | Carley |
| 2013/0127772 | A1 | 5/2013 | Guard |
| 2013/0127775 | A1 | 5/2013 | Yilmaz |
| 2013/0127776 | A1 | 5/2013 | Guard |
| 2013/0155000 | A1 | 6/2013 | Trend |
| 2013/0207911 | A1 * | 8/2013 | Barton ................ G06F 3/0488 345/173 |
| 2013/0234974 | A1 | 9/2013 | Guard |
| 2013/0294037 | A1 | 11/2013 | Kuriki |
| 2013/0341070 | A1 | 12/2013 | Kim |
| 2013/0342472 | A1 | 12/2013 | Guard |
| 2014/0152580 | A1 | 6/2014 | Weaver |
| 2014/0152613 | A1 | 6/2014 | Ishizaki |
| 2014/0184936 | A1 | 7/2014 | Oh |
| 2014/0225839 | A1 | 8/2014 | Dunphy |
| 2015/0070292 | A1 * | 3/2015 | Saran ................ H03K 17/9622 345/174 |
| 2015/0077349 | A1 | 3/2015 | Guard |

OTHER PUBLICATIONS

U.S. Appl. No. 61/454,950, filed Mar. 21, 2011, Lynch.
U.S. Appl. No. 61/454,894, filed Mar. 21, 2011 Rothkopf.
U.S. Appl. No. 14/248,096, filed Apr. 8, 2014, Guard.
U.S. Appl. No. 14/248,117, filed Apr. 8, 2014, Guard.
U.S. Appl. No. 14/469,918, filed Aug. 27, 2014, Guard.
Non-Final Office Action for U.S. Appl. No. 13/910,055, filed Sep. 10, 2013.
Response to Non-Final Office Action for U.S. Appl. No. 13/910,055, filed Dec. 10, 2013.
Notice of Allowance for U.S. Appl. No. 13/910,055, filed Jan. 14, 2014.
Non-Final Office Action for U.S. Appl. No. 13/031,372, filed Jul. 16, 2015.
Non-Final Office Action for U.S. Appl. No. 14/159,981, filed May 16, 2014.
Response to Non-Final Office Action for U.S. Appl. No. 14/159,981, filed Jun. 19, 2014.
Notice of Allowance for U.S. Appl. No. 14/159,981, filed Jul. 28, 2014.
Notice of Allowance for U.S. Appl. No. 14/183,876, filed Oct. 14, 2014.
Notice of Allowance for U.S. Appl. No. 14/183,918, filed Oct. 8, 2014.
Response to Non-Final Office Action for U.S. Appl. No. 14/300,995, filed Oct. 24, 2014.
Notice of Allowance for U.S. Appl. No. 14/300,995, filed Nov. 13, 2014.
Non-Final Office Action for U.S. Appl. No. 14/469,918, filed Dec. 31, 2014.
Response to Non-Final Office Action for U.S. Appl. No. 14/469,918, filed Mar. 5, 2015.
Final Office Action for U.S. Appl. No. 14/469,918, filed Mar. 18, 2015.
Response to Final Office Action for U.S. Appl. No. 14/469,918, filed Apr. 28, 2015.
Response to Final Office Action for U.S. Appl. No. 14/469,918, filed Jun. 18, 2015.
Non-Final Office Action for U.S. Appl. No. 14/469,918, filed Jul. 27, 2015.

* cited by examiner

OPTICAL-BAND VISIBILITY FOR TOUCH-SENSOR MESH DESIGNS

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
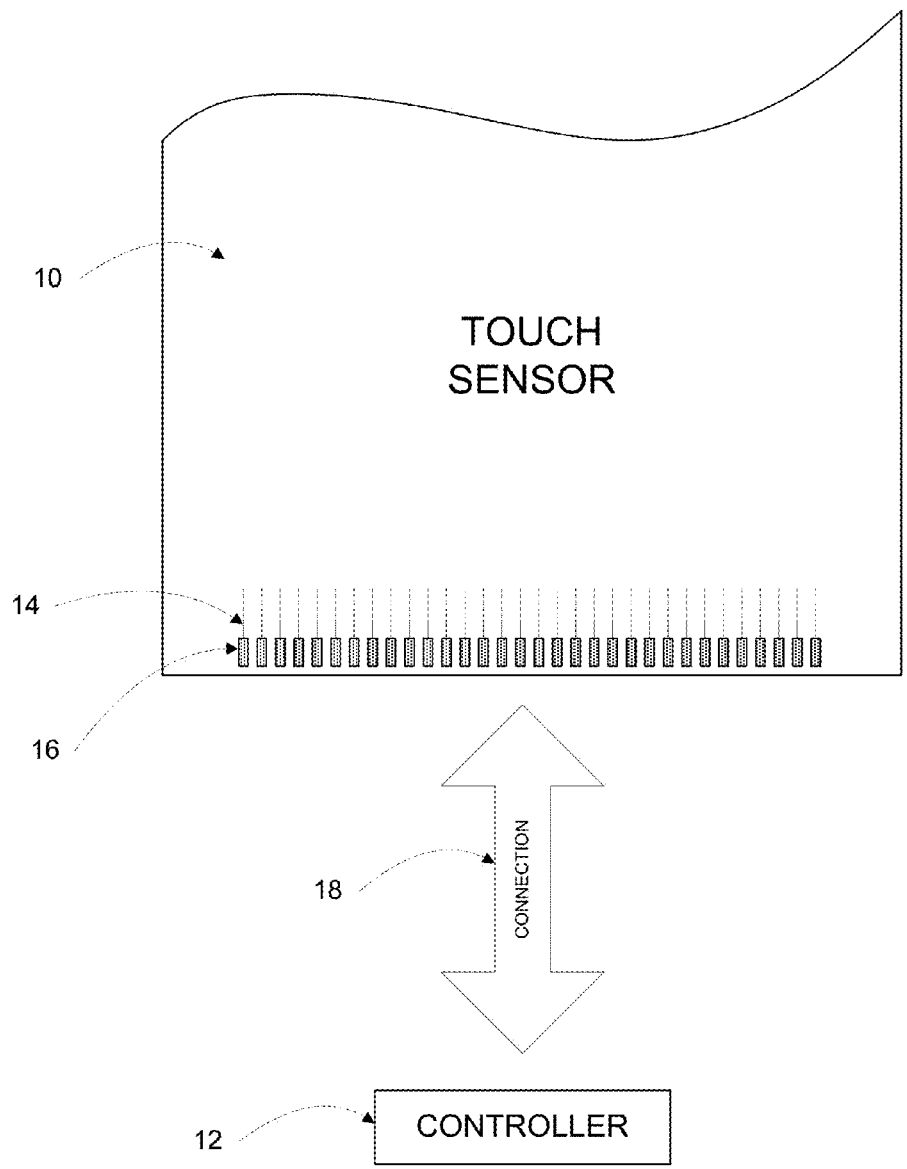
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 1% to approximately 10% of the area of its shape in a hatched, mesh, or other suitable pattern. Herein, reference to FLM encompasses such material, where appropriate. In particular embodiments, the percentage of FLM that covers a particular area may be referred to as a metal density. The fine lines of conductive material may be opaque or substantially reflective, and in particular embodiments, the combined optical transmissivity of electrodes formed using a conductive mesh may be approximately 90% or higher, ignoring a reduction in transmittance due to other factors such as the substrate material. Thus, the contribution of the fine lines of conductive material to the attenuation of light through the conductive mesh may be within a range of approximately 1% to approximately 10%. In particular embodiments, the attenuation of light when passing through a conductive mesh may be referred to as a blocking of light or an optical transmission loss. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection. Additionally, when overlaid over a display, one or more micro-features of the touch sensor (e.g., a touch-sensor mesh pattern, as described below) may, at least in part, determine an amount or a characteristic of a moiré-pattern effect exhibited by the touch sensor-display combination.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
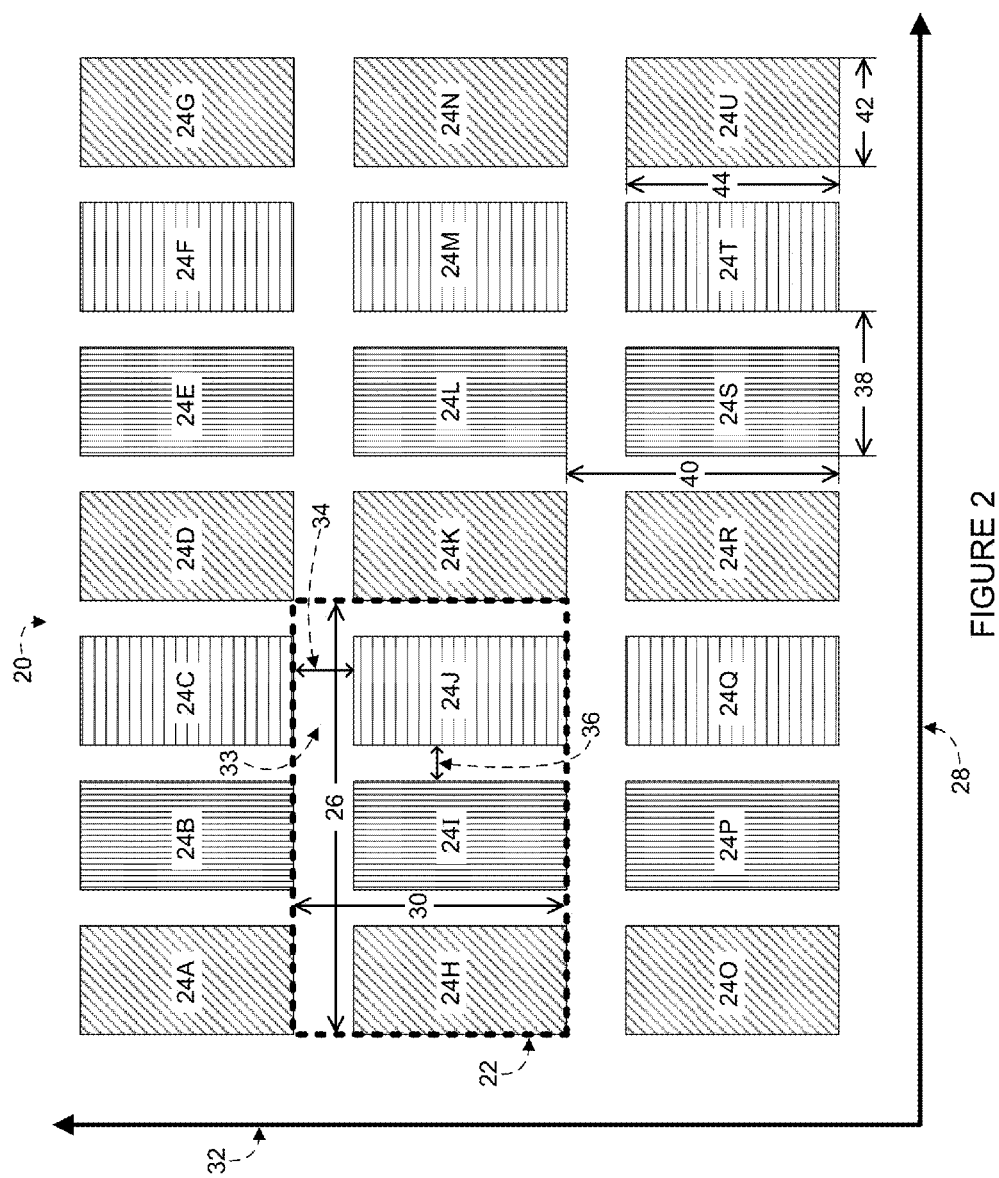
FIG. 2 illustrates an example portion of an example display that includes example pixels and sub-pixels.

FIG. 2 illustrates an example portion 20 of an example display that includes example pixels 22 and sub-pixels 24. A touch sensor may be overlaid on the display to implement a touch-sensitive display device. As an example and not by way of limitation, the display underneath the touch sensor may be a liquid crystal display (LCD), a light-emitting diode (LED) display, an organic LED display, an LED backlight LCD, an electrophoretic display, a plasma display, or other suitable display. Although this disclosure describes and illustrates particular display types, this disclosure contemplates any suitable display types.

Portion 20 includes an array of pixels 22. In the example of FIG. 2, each pixel 22 includes three sub-pixels 24. In particular embodiments, each sub-pixel 24 may correspond to a particular color, such as for example red, green, or blue. The area of a pixel 22 (which may include dead space as discussed below) is indicated by the dashed-line border that encompasses sub-pixels 24H, 24I, and 24J in FIG. 2, where each sub-pixel may correspond to the color red, green, or blue, respectively. The combined output of sub-pixels 24 determines the color and intensity of each pixel 22. Although this disclosure describes and illustrates example pixels 22 with a particular number of sub-pixels 24 having particular colors, this disclosure contemplates any suitable pixels with any suitable number of sub-pixels having any suitable colors.

Pixels 22 and sub-pixels 24 may be arranged in a repeating pattern along a horizontal axis 28 and a vertical axis 32 that are substantially perpendicular to each other. In particular embodiments, horizontal axis 28 may be referred to as an x-axis or a first axis, and vertical axis 32 may be referred to as a y-axis or a second axis. Although this disclosure describes and illustrates horizontal and vertical axes, this disclosure contemplates any suitable axes having any suitable orientation. Moreover, although this disclosure describes and illustrates particular axes having particular orientations relative to one another, this disclosure contemplates any suitable axes having any suitable orientation relative to one another.

Each pixel 22 has a horizontal pixel pitch 26, which in particular embodiments may be defined as the distance between corresponding features of two adjacent pixels 22 along horizontal axis 28 (such as the distance from the left edge of sub-pixel 24H to the left edge of sub-pixel 24K). Each pixel 22 also has a vertical pixel pitch 30, which in particular embodiments may be defined as the distance between corresponding features of two adjacent pixels 22 or two adjacent sub-pixels 24 along vertical axis 32 (such as the distance from the lower edge of sub-pixel 24I to the lower edge of sub-pixel 24B). In particular embodiments, horizontal pixel pitch 26 may be referred to as HPP or $PP_x$, and vertical pixel pitch 30 may be referred to as VPP or $PP_y$. In particular embodiments, horizontal pixel pitch 26 may be referred to as a pixel width or the width of pixel 22, and vertical pixel pitch 30 may be referred to as a pixel height or the height of pixel 22. This disclosure contemplates any suitable pixels with any suitable horizontal and vertical pixel pitches having any suitable values.

Sub-pixel 24 may have a substantially rectangular shape, as illustrated in FIG. 2. In particular embodiments, sub-pixel 24 may have other suitable shapes, including but not limited to square, round, oval, or chevron-shaped. In particular embodiments, horizontal pixel pitch 26 may be approximately 50 μm, 100 μm, 150 μm, 200 μm, 250 μm, 300 μm, or any suitable dimension. In particular embodiments, vertical pixel pitch 30 may be approximately 50 μm, 100 μm, 150 μm, 200 μm, 250 μm, 300 μm, or any suitable dimension. In particular embodiments, horizontal pixel pitch 26 may be approximately the same as vertical pixel pitch 30, and pixel 22 may have a substantially square shape. In particular embodiments, pixel 22 having a substantially square shape may refer to horizontal pixel pitch 26 and vertical pixel pitch 26 having approximately the same dimension to within 1%, 2%, 5%, or to within any suitable percentage. As an example and not by way of limitation, a display may include pixels 22 with horizontal pixel pitch 26 and vertical pixel pitch 30 equal to 100 μm±1%, and pixels 22 may have a square shape with a 100-μm±1-μm height and a 100-μm±1-μm width. As another example and not by way of limitation, a display may have pixels 22 with horizontal pixel pitch 26 and vertical pixel pitch 30 approximately equal to 250 μm±2%, and pixels 22 may have a square shape with a height and width of 250 μm±5 μm. As another example and not by way of limitation, a display may include pixels 22 that are substantially square with a horizontal pixel pitch 26 of 99-μm±2-μm and a vertical pixel pitch 30 of 101-μm±2-μm. Although this disclosure describes and illustrates particular pixels having particular dimensions and particular pixel pitches, this disclosure contemplates any suitable pixels having any suitable dimensions and any suitable pixel pitches.

Each pixel 22 may also include dead space 33, which corresponds to regions of pixel 22 not occupied by a sub-pixel 24. In particular embodiments, sub-pixel 24 may include a color element that emits a particular color (e.g., red, green, or blue), and sub-pixel 24 may be separated from adjacent sub-pixels 24 by dead space 33. In particular embodiments, dead space 33 may include circuitry (e.g., conductive traces, wiring, drive transistors, or any other suitable electronic components) associated with providing a drive current or voltage to a color-emitting element of sub-pixel 24. In particular embodiments, dead space 33 has a height (DSH) 34 that may be defined as the distance between adjacent sub-pixels 24 along vertical axis 32 (such as the distance between the top edge of sub-pixel 24J and the bottom edge of sub-pixel 24C in FIG. 2). In particular embodiments, dead space 33 has a width (DSW) 36 that may be defined as the distance between adjacent sub-pixels 24 along horizontal axis 28 (such as the distance between the right edge of sub-pixel 24I and the left edge of sub-pixel 24J). Although this disclosure describes and illustrates particular pixels with particular dead space having particular dimensions, this disclosure contemplates any suitable pixels with any suitable dead space having any suitable dimensions.

Each sub-pixel 24 has a horizontal sub-pixel pitch 38, which may be defined in particular embodiments as the distance between corresponding features of two adjacent sub-pixels along horizontal axis 28, including width 36 of dead space 33 (such as the distance between the left edges of sub-pixels 24S and 24T in FIG. 2). Each sub-pixel 24 also has a vertical sub-pixel pitch 40, which may be defined in particular embodiments as the distance between corresponding features of two adjacent sub-pixels along vertical axis 32, including height 34 of dead space 33 (such as the distance between the lower edges of sub-pixels 24S and 24L). In particular embodiments, horizontal sub-pixel pitch 38 may be referred to as HSPP or $SPP_x$, and vertical sub-pixel pitch 40 may be referred to as VSPP or $SPP_y$. In particular embodiments, horizontal pixel pitch 26 is equal to three times horizontal sub-pixel pitch 38, so that $PP_x = 3 \times SPP_x$, or $$SPP_x = \frac{1}{3} \times PP_x.$$

In particular embodiments, vertical pixel pitch 30 is equal to vertical sub-pixel pitch 40.

Each sub-pixel 24 has a sub-pixel width (referred to as SPW or $SPD_x$) 42, which may be defined in particular embodiments as the sub-pixel dimension along horizontal axis 28 (such as the distance between the left and right edges of sub-pixel 24U in FIG. 2). In particular embodiments, $SPD_x$ 42 may be referred to as a distance between opposing edges of the color element of sub-pixel 24 along horizontal axis 28. Each sub-pixel 24 also has a sub-pixel height (referred to as SPH or $SPD_y$) 44, which may be defined in particular embodiments as the sub-pixel dimension along vertical axis 32 (such as the distance between the lower and upper edges of sub-pixel 24U). In particular embodiments, $SPD_y$ 44 may be referred to as a distance between opposing edges of the color element of sub-pixel 24 along vertical axis 32. In the example of FIG. 2, horizontal pixel pitch 26 is equal to three times horizontal sub-pixel pitch 38, and horizontal sub-pixel pitch 38 is equal to the sum of $SPD_x$ 42 and DSW 36. In the example of FIG. 2, vertical sub-pixel pitch 40 is equal to vertical pixel pitch 30, and vertical pixel pitch 30 is equal to the sum of $SPD_y$ 44 and DSH 34. In particular embodiments, each pixel 22 may include three sub-pixels 24, and each sub-pixel 24 may have approximately the same dimensions, $SPD_x$ 42 and $SPD_y$ 44.

In particular embodiments, pixel 22 may have a substantially square shape so that $PP_x \cong PP_y$. As an example and not by way of limitation, pixel 22 may have a square shape with height and width of approximately 150 μm. Such a 150-μm square pixel 22 may have a $SPP_x$ 38 of approximately 50 μm since $$SPP_x = \frac{1}{3} \times PP_x = \frac{1}{3} \times (150 \ \mu m) = 50 \ \mu m.$$

Moreover, $SPD_x$ 42 may be approximately 42 μm, and DSW 36 may be approximately 8 μm, which corresponds to a $SPP_x$ 38 of 50 μm. Similarly, $SPD_y$ 44 may be approximately 140 μm, and DSH 34 may be approximately 10 μm, which corresponds to a vertical pixel pitch 30, or pixel height, of 150 μm. Although this disclosure describes and illustrates particular pixels and sub-pixels having particular shapes, arrangements, and dimensions, this disclosure contemplates any suitable pixels and sub-pixels having any suitable shapes, arrangements, and dimensions. Moreover, although this disclosure describes and illustrates particular pixels and sub-pixels having particular pitches and dimensions, this disclosure contemplates any suitable pixels and sub-pixels having any suitable pitches and dimensions.

Figure 3:
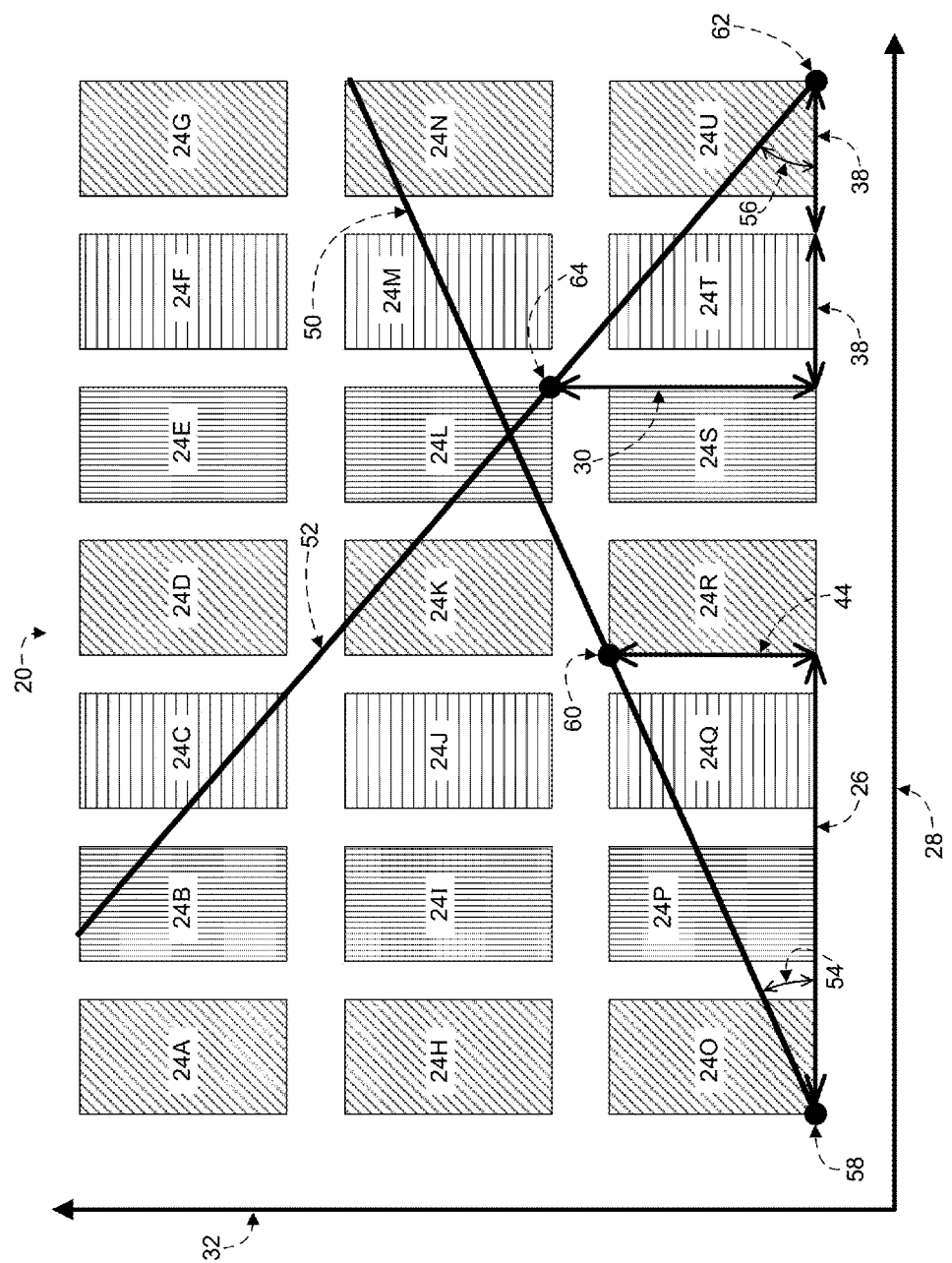
FIG. 3 illustrates the example display portion of FIG. 2 with example conductive lines overlying the display portion.

FIG. 3 illustrates the example display portion 20 of FIG. 2 with example conductive lines 50 and 52 overlying the display portion 20. Conductive lines 50 and 52 may be FLM and may make up part of a mesh pattern of an electrode of a touch sensor. In particular embodiments, an arrangement of conductive lines that make up at least part of a touch sensor may be referred to as a mesh, mesh pattern, or mesh design. Although this disclosure describes and illustrates a touch sensor overlying a display, this disclosure contemplates suitable portions of a touch sensor (including suitable portions of conductive lines 50 and 52) being disposed on one or more layers on or within a display stack of the display, where appropriate.

In the example of FIG. 3, conductive line 50 is oriented at an angle 54 ($\theta_{54}$) relative to horizontal axis 28, and conductive line 52 is oriented at an angle 56 ($\theta_{56}$) relative to horizontal axis 28. Angle 54 of conductive line 50 can be illustrated by drawing a line that passes through reference points 58 and 60, where reference point 58 is located at the lower left corner of sub-pixel 24O and reference point 60 is located at the upper left corner of sub-pixel 24R. The slope of conductive line 50 may be defined as the vertical rise of conductive line 50 divided by the horizontal run of conductive line 50, and angle 54 can be found from the arctangent of that slope. In the example of FIG. 3, the vertical rise of conductive line 50 is $SPD_y$ 44, and the horizontal run of conductive line 50 is $PP_x$ 26. Thus, the slope of conductive line 50 equals $$\left(\frac{SPD_y}{PP_x}\right),$$

and angle 54 can be found from the expression $$\theta_{54} = \arctan\left(\frac{SPD_y}{PP_x}\right).$$

In FIG. 3, the vertical rise of conductive line 50 can also be expressed as ($PP_y$–DSH), in which case the slope of conductive line 50 can be written $$\left(\frac{PP_y - DSH}{PP_x}\right),$$

and angle 54 can be found from the expression $$\theta_{54} = \arctan\left(\frac{PP_y - DSH}{PP_x}\right).$$

In the example of FIG. 3, angle 56 of conductive line 52 can be illustrated by drawing a line that passes through reference points 62 and 64, where reference point 62 is located at the lower right corner of sub-pixel 24U and reference point 64 is located at the lower right corner of sub-pixel 24L. The slope of conductive line 52 may be defined as the vertical rise of conductive line 52 divided by the horizontal run of conductive line 52, and angle 56 can be found from the arctangent of that slope. In the example of FIG. 3, the vertical rise of conductive line 52 is $PP_y$ 30, and the horizontal run of conductive line 52 is two times $SPP_x$ 38. Thus, the slope of conductive line 52 equals $$\left(\frac{PP_y}{2 \times SPP_x}\right),$$

and angle 56 can be found from the expression $$\theta_{56} = \arctan\left(\frac{PP_y}{2 \times SPP_x}\right).$$

In FIG. 3, the horizontal run of conductive line 52 can also be expressed as $$\frac{2}{3} PP_x,$$

in which case the slope of conductive line 52 can be written $$\left(\frac{PP_y}{\frac{2}{3} PP_x}\right),$$

and angle 56 can be found from the expression $$\theta_{56} = \arctan\left(\frac{3 PP_y}{2 PP_x}\right).$$

In particular embodiments, conductive lines 50 and 52 may make up part of a mesh pattern of a touch sensor and angles $\theta_{54}$ and $\theta_{56}$ may vary by up to 0.2°, 0.5°, 1°, or any suitable angular amount from the values calculated in the expressions above without substantially degrading the optical performance of the mesh pattern. Angles $\theta_{54}$ and $\theta_{56}$ of conductive lines 50 and 52, respectively, in FIGS. 4-9 (which are described below) may similarly vary. As an example and not by way of limitation, display portion 20 in FIG. 3 may have substantially square pixels 22 with height and width of approximately 100 μm so that $PP_x \cong PP_y \cong 100$ μm. Additionally, display portion 20 may have a $SPP_x$ 38 of approximately 33.3 μm, and a $SPD_y$ of approximately 84 μm. For such an example display portion 20, angle 54 of conductive line 50 is and angle 56 of is $$\theta_{54} = \arctan\left(\frac{SPD_y}{PP_x}\right) = \arctan\left(\frac{84}{100}\right) \cong 40.0°,$$

and angle 56 of conductive line 52 is $$\theta_{56} = \arctan\left(\frac{PP_y}{2 \times SPP_x}\right) = \arctan\left(\frac{100}{2 \times 33.3}\right) \cong 56.3°.$$

As an example and not by way of limitation, a mesh pattern may include conductive lines 50 with angle 54 that is within 1° of 40.0°, so that angle 54 for conductive lines 50 may be between 39.0° and 41.0°. As another example and not by way of limitation, a mesh pattern may include conductive lines 52 with angle 56 that is within 1.0° of 56.3°, so that angle 56 may be between 55.3° and 57.3°. Although this disclosure describes and illustrates particular conductive lines having particular angles with respect to a particular axis of a display, this disclosure contemplates any suitable conductive line having any suitable angle with respect to any suitable axis of a display.

In the example of FIG. 3, conductive line 50 is oriented counterclockwise at angle 54 relative to horizontal axis 28, and conductive line 52 is oriented clockwise at angle 56 relative to horizontal axis 28. In particular embodiments, a mesh design may include two sets of conductive lines, where the first set includes conductive lines that are substantially parallel and have a counterclockwise orientation with respect to horizontal axis 28 at an angle 54, and the second set includes conductive lines that are substantially parallel and have a clockwise orientation with respect to horizontal axis 28 at an angle 56. In particular embodiments, conductive line 50 may be oriented clockwise at angle 54 relative to horizontal axis 28, and conductive line 52 may be oriented counterclockwise at angle 56 relative to horizontal axis 28. In particular embodiments, conductive line 50 may be oriented clockwise or counterclockwise at angle 54 relative to horizontal axis 28, and conductive line 52 may be oriented clockwise or counterclockwise at angle 56 relative to horizontal axis 28. Although this disclosure describes and illustrates example conductive lines 50 and 52 having particular orientations relative to horizontal axis 28, this disclosure contemplates any suitable clockwise or counterclockwise orientation of conductive lines relative to any suitable axis. As described above, in particular embodiments, angles 54 and 56 may vary by up to approximately 1° from the values calculated in the expressions above without substantially degrading the optical performance of the mesh pattern. Such rotation of up to approximately 1° may occur during a manufacturing or assembly process (as an intentional design feature, or as an incidental result of routine process variations), for example. Similarly, a mesh pattern made up of conductive lines 50 and 52 in any of FIGS. 4-9 described below may have conductive lines 50 and 52 with any suitable clockwise or counterclockwise rotational orientation and a variation of angles 54 and 56 of up to approximately 1°.

In the example of FIG. 3 (and FIGS. 4-6 described below), reference points 58, 60, 62, and 64 do not correspond to any conductive or other material of a touch sensor. Instead, reference points 58, 60, 62, and 64 are used as a basis to determine angles 54 and 56 of a mesh pattern. Moreover, in the example of FIG. 3 (and FIGS. 4-6 described below) reference points 58, 60, 62, and 64 are intended as a guide to illustrating or constructing angles 54 and 56, and reference points 58, 60, 62, and 64 are not constrained to be located only at particular locations such as lower-left or lower right corners of particular sub-pixels 24. As an example and not by way of limitation, reference points 58, 60, 62, and 64 may be referenced to any suitable locations, such as for example, a corner, an edge, or a center of particular pixels 22, sub-pixels 24, or regions of dead space 33. Similarly, conductive lines 50 and 52 are not constrained to pass through any particular reference points (e.g., 58, 60, 62, or 64); rather, conductive lines 50 and 52 are at least in part characterized by their angles, 54 and 56, respectively, with respect to horizontal axis 28. In particular embodiments, conductive lines 50 and 52 need not be constrained to pass through any particular reference points but may be displaced along horizontal axis 28 and vertical axis 32 by any suitable amount. Additionally, a mesh pattern that includes conductive lines 50 and 52 may be displaced horizontally, vertically, or both relative to pixels 22 or sub-pixels 24 (as may occur during a manufacturing process) without substantially degrading the optical performance of the mesh pattern. A mesh pattern made up of conductive lines 50 and 52 in any of FIGS. 4-9 described below may similarly have any suitable alignment or displacement relative to pixels 22 or sub-pixels 24 of a display. Although this disclosure describes and illustrates particular conductive lines having particular angles, this disclosure contemplates any suitable conductive lines having any suitable angles. Moreover, although this disclosure describes and illustrates particular conductive lines having particular angles defined by particular reference points, this disclosure contemplates any suitable conductive lines having any suitable angles defined by any suitable reference points.

Figure 4:
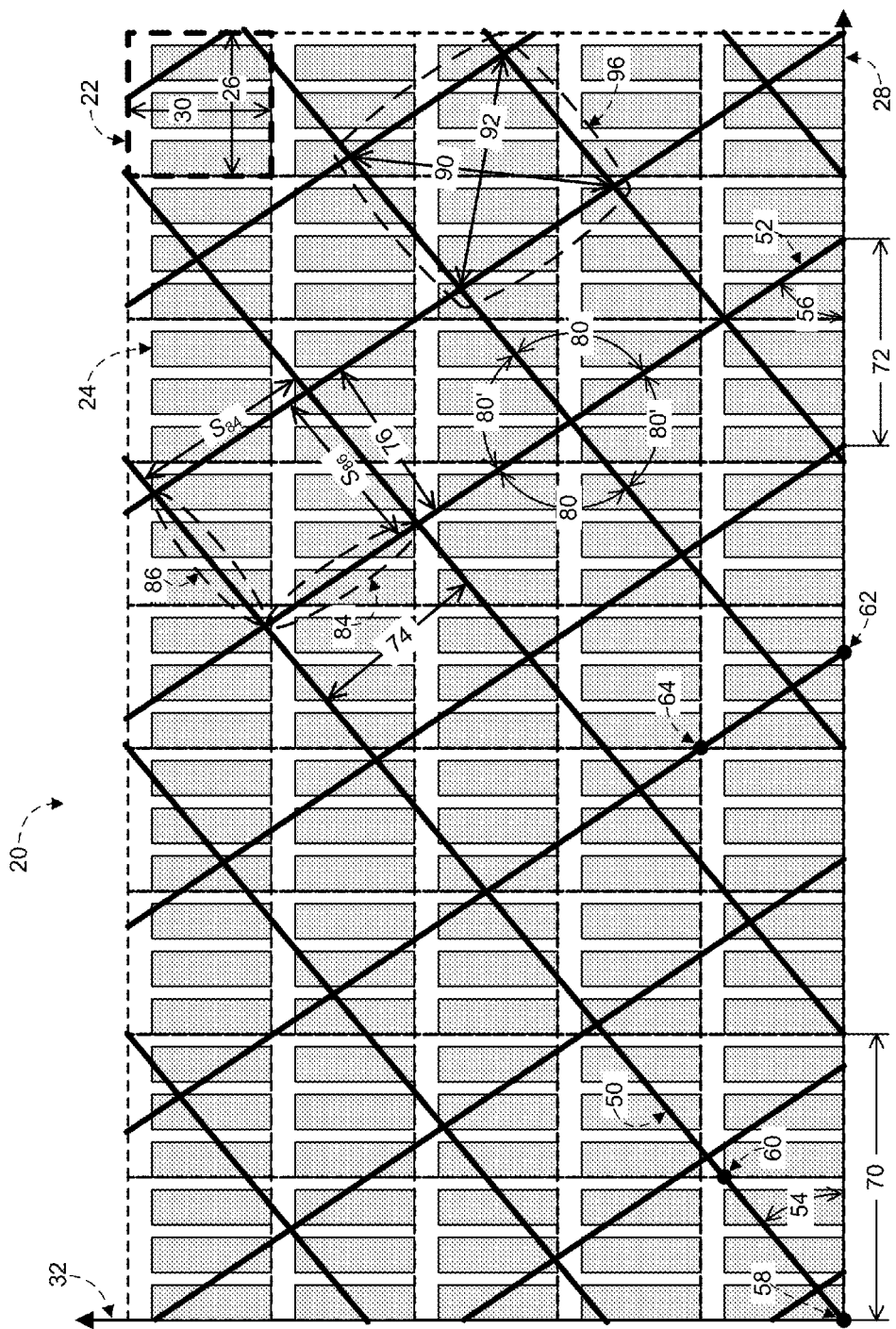
FIG. 4 illustrates an example mesh design overlying another example portion of an example display.

FIG. 4 illustrates an example mesh design overlying another example portion 20 of an example display. Display portion 20 includes pixels 22 arranged along horizontal axis 28 and vertical axis 32. In FIG. 4 (and FIGS. 5-8 which are described below), each pixel 22 has horizontal pixel pitch 26 ($PP_x$) and vertical pixel pitch 30 ($PP_y$), and each pixel 22 includes three sub-pixels 24. Pixels 22 in FIG. 4 are substantially square so that $PP_x$ and $PP_y$ are approximately the same. The example mesh design in FIG. 4 (and FIGS. 6-9 described below) includes conductive lines 50 and 52, and conductive lines 50 and 52 may be FLM and may make up part of a mesh pattern of an electrode of a touch sensor.

Conductive lines 50 in FIG. 4 are substantially parallel to each other, and each conductive line 50 forms an angle 54 relative to horizontal axis 28. Additionally, conductive lines 50 in FIG. 4 are substantially evenly spaced from one another with adjacent conductive lines 50 having an equal horizontal separation distance 70 along horizontal axis 28. Conductive lines 52 in FIG. 4 are also substantially parallel to each other, forming an angle 56 relative to horizontal axis 28. Conductive lines 52 are also substantially evenly spaced from one another with adjacent conductive lines 52 having an equal horizontal separation distance 72. As described above and illustrated in FIG. 3, angles 54 and 56 in FIG. 4 can be found from the expressions $$\theta_{54} = \arctan\left(\frac{SPD_y}{PP_x}\right) \text{ and } \theta_{56} = \arctan\left(\frac{PP_y}{2 \times SPP_x}\right),$$

respectively. In particular embodiments, horizontal separation distance 70 refers to a distance between adjacent conductive lines 50 as measured along horizontal axis 28. Similarly, in particular embodiments, horizontal separation distance 72 refers to a distance between adjacent conductive lines 52 as measured along horizontal axis 28. In particular embodiments, horizontal separation distances 70 and 72 may be referred to as separation distances, line separation distances, horizontal line-separation distances, or line spacings.

In particular embodiments, conductive lines 50 have a horizontal separation distance 70 along horizontal axis 28 that may be expressed as $D_{70}=k \times PP_x$, where $D_{70}$ is horizontal separation distance 70 of conductive lines 50, k is a positive integer, and $PP_x$ is horizontal pixel pitch 26. In particular embodiments, k may be referred to as a line-separation parameter. Similarly, in particular embodiments, conductive lines 52 have a horizontal separation distance 72 along horizontal axis that may be expressed as $$D_{72} = \frac{13}{18} \times k \times PP_x,$$

where $D_{72}$ is horizontal separation distance 72 of conductive lines 52 and k is the same positive integer used to determine $D_{70}$. Horizontal separation distance 72 may also be expressed equivalently as $$D_{72} = \left(2\frac{1}{6}\right) \times \frac{k}{3} \times PP_x.$$

In particular embodiments, if horizontal pixel pitch 26 equals three times horizontal sub-pixel pitch 38, the expression for horizontal separation distance 72 may be written $$D_{72} = \left(2\frac{1}{6}\right) \times SPP_x \times k.$$

In the example of FIG. 4, the line-separation parameter k equals 2, which gives a horizontal separation distance 70 of $D_{70}=2 \times PP_x$, and a horizontal separation distance $$72 \text{ of } D_{72} = \frac{13}{9} \times PP_x.$$

In particular embodiments, perpendicular separation distance 74 may indicate a distance between two adjacent, parallel conductive lines as measured along a direction perpendicular to the two lines. In particular embodiments, a perpendicular separation distance 74 between conductive lines 50 is measured in a direction perpendicular to conductive lines 50. Perpendicular separation distance 74 is related to horizontal separation distance 70 by the expression $D_{74}=D_{70} \sin \theta_{54}$, where $D_{74}$ is perpendicular separation distance 74. Similarly, in particular embodiments, a perpendicular separation distance 76 between conductive lines 52 is measured in the direction perpendicular to conductive lines 52. Perpendicular separation distance 76 is related to horizontal separation distance 72 by the expression $D_{76}=D_{72} \sin \theta_{56}$, where $D_{76}$ is perpendicular separation distance 76. In FIG. 4, perpendicular separation distance 74 equals $2PP_x \sin \theta_{54}$, and perpendicular separation distance 76 equals $$\frac{13}{9} PP_x \sin \theta_{56}.$$

In FIG. 4, angle 80 ($\theta_{80}$) may be referred to as an angle between conductive lines 50 and 52, and angle 80 equals the sum of angles 54 and 56, or $\theta_{80}=\theta_{54}+\theta_{56}$. In FIG. 4, angle 80' ($\theta'_{80}$) is another angle between conductive lines 50 and 52, and angle 80' is the supplement to angle 80, so that angle 80' is $180°-\theta_{80}$. In particular embodiments, angle 80 may refer to an angle between conductive lines 50 and 52, where angle 80 faces in a nominally horizontal direction. Similarly, in particular embodiments, angle 80' may refer to an angle between conductive lines 50 and 52, where angle 80' faces in a nominally vertical direction. In particular embodiments, line segment 84 represents a length of conductive line 52 between two adjacent conductive lines 50. Line segment 84 has length $S_{84}$ that is related to horizontal separation distance 70 by the expression $$S_{84} = D_{70} \times \frac{\sin \theta_{54}}{\sin \theta'_{80}}.$$

Similarly, in particular embodiments, line segment 86 represents a length of conductive line 50 between two adjacent conductive lines 52. Line segment 86 has length $S_{86}$ that is related to horizontal separation distance 72 by the expression $$S_{86} = D_{72} \times \frac{\sin \theta_{56}}{\sin \theta'_{80}}.$$

Segment length $S_{84}$ may be related to perpendicular separation distance 74 ($D_{74}$) by the expression $$S_{84} = \frac{D_{74}}{\sin \theta'_{80}}.$$

Similarly, segment length $S_{86}$ may be related to perpendicular separation distance 76 ($D_{76}$) by the expression $$S_{86} = \frac{D_{76}}{\sin \theta'_{80}}.$$

In particular embodiments, a mesh cell 96 may include three or more portions or segments of conductive lines 50 and 52 that together form an enclosed shape, such as for example a triangle, parallelogram, or quadrilateral. In FIG. 4, mesh cell 96 includes two adjacent line segments 84 and two adjacent line segments 86 that together form a four-sided shape. In particular embodiments, a mesh design may include multiple mesh cells 96 arranged in a repeating pattern. Although this disclosure describes and illustrates particular mesh cells that include a particular number of line segments, this disclosure contemplates any suitable mesh cells that include any suitable number of line segments. In FIG. 4, diagonal length 90 is the distance between the two opposite vertices of mesh cell 96 that represent the vertical extent of the mesh cell. Similarly, diagonal length 92 is the distance between the other two opposite vertices of mesh cell 96 that represent the horizontal extent of the mesh cell. In particular embodiments, diagonal length 90 may be referred to as a vertical diagonal length, and diagonal length 92 may be referred to as a horizontal diagonal length. Diagonal length 90 ($D_{90}$) may be found from the expression $D_{90}^2 = S_{84}^2 + S_{86}^2 - 2 S_{84} S_{86} \cos \theta_{80}$, and diagonal length 92 ($D_{92}$) may be found from the expression $D_{92}^2 = S_{84}^2 + S_{86}^2 - 2S_{84}S_{86} \cos \theta'_{80}$.

As an example and not by way of limitation, display portion 20 in FIG. 4 may have substantially square pixels 22 with height and width of approximately 170 μm so that $PP_x \cong PP_y \cong 170$ μm. Additionally, such a 170-μm square pixel 22 may have a $SPP_x$ 38 of approximately 56.7 μm, and a $SPD_y$ of approximately 155 μm. For such an example display portion 20, angle 54 of conductive line 50 is $$\theta_{54} = \arctan\left(\frac{SPD_y}{PP_x}\right) = \arctan\left(\frac{155}{170}\right) \cong 42.4°,$$

and angle 56 of conductive line 52 is $$\theta_{56} = \arctan\left(\frac{PP_y}{2 \times SPP_x}\right) = \arctan\left(\frac{170}{2 \times 56.7}\right) \cong 56.3°.$$

In FIG. 4, for pixel pitches $PP_x \cong PP_y \cong 170$ μm, horizontal separation distance 70 is approximately $D_{70} = 2 \times (170$ μm$)$, or 340 μm, and horizontal separation distance 72 is approximately $$D_{72} = \frac{13}{9} \times (170 \ \mu m),$$

or 245.6 μm. Additionally, perpendicular separation distance 74 is $D_{74} = D_{70} \sin \theta_{54} = (340$ μm$) \times \sin(42.4°) \cong 229.3$ μm, and perpendicular separation distance 76 is $D_{76} = D_{72} \sin \theta_{56} = (245.6$ μm$) \times \sin(56.3°) \cong 204.3$ μm. Angle 80 is approximately $42.4° + 56.3° = 98.7°$, and angle 80' is approximately 81.3°. Moreover, length of line segment 84 is $$S_{84} = D_{70} \times \frac{\sin \theta_{54}}{\sin \theta_{80}} \cong (340 \ \mu m) \times \frac{\sin 42.4°}{\sin 81.3°} \cong 231.9 \ \mu m,$$

and length of line segment 86 is $$S_{86} = D_{72} \times \frac{\sin \theta_{56}}{\sin \theta_{80}} \cong (245.6 \ \mu m) \times \frac{\sin 56.3°}{\sin 81.3°} \cong 206.7 \ \mu m,$$

From the expressions above for diagonal lengths 90 and 92, diagonal length 90 is approximately $D_{90} \cong 333.2$ μm, and diagonal length 92 is approximately $D_{92} \cong 286.4$ μm.

In particular embodiments, horizontal separation distances 70 and 72, perpendicular separation distances 74 and 76, line segment lengths $S_{84}$ and $S_{86}$, or diagonal lengths 90 and 92 may vary by up to 0.5%, 1%, 2%, 3%, or by any suitable percentage. In particular embodiments, such variation in distance or length may occur during a manufacturing process (as an intentional design feature, or as an incidental result of routine process variations). As an example and not by way of limitation, for a 1% variation in horizontal separation distances, horizontal separation distance 70 in FIG. 4 may be expressed as 340 μm±1%, or 340 μm±3.4 μm, and horizontal separation distance 72 may be expressed as 245.6 μm±1%, or 245.6 μm±2.5 μm. In particular embodiments, horizontal separation distance 70 may be referred to as being within 1% of 340 μm, and horizontal separation distance 72 may be referred to as being within 1% of 245.6 μm. Although this disclosure describes and illustrates particular mesh patterns having particular horizontal separation distances and particular variation of horizontal separation distances, this disclosure contemplates any suitable mesh patterns having any suitable horizontal separation distances and any suitable variation of horizontal separation distances.

In particular embodiments, the mesh design of FIG. 4 with k=2 may be preferable for a display where $PP_x$ and $PP_y$ are on the order of approximately 155 μm to 200 μm. In particular embodiments, it may be preferable for a mesh design to have diagonal length 90 or diagonal length 92 in the range of approximately 265-340 μm. As an example and not by way of limitation, a mesh design with diagonal lengths 90 or 92 in the range of approximately 265-340 μm may have a metal density of approximately 3% to 5% for conductive lines 50 and 52 with widths of approximately 5 μm. Such an example mesh design may block approximately 3% to 5% of incident light, such as for example, light emitted by a display positioned below the mesh. In particular embodiments, a mesh design with diagonal lengths 90 or 92 of less than 340 μm may be associated with a mesh having a line density sufficiently high (or, perpendicular separation distances 74 and 76 sufficiently low) so as to be difficult to resolve the lines visually with the human eye. In particular embodiments, line density refers to a density of conductive lines and is equal to the reciprocal of perpendicular separation distance 74 or 76. As an example and not by way of limitation, conductive lines 50 with a perpendicular separation distance 74 of approximately 240 μm, which may be associated with a mesh having a diagonal length 90 or 92 of approximately 340 μm, may be referred to as having a line density of approximately 1/240 μm≅4.2 lines per millimeter. Although this disclosure describes and illustrates particular mesh patterns having particular mesh cells with particular diagonal lengths, this disclosure contemplates any suitable mesh patterns having any suitable mesh cells with any suitable diagonal lengths. Moreover, although this disclosure describes and illustrates particular mesh patterns having particular line-separation parameters (k), this disclosure contemplates any suitable mesh pattern having any suitable line-separation parameter.

Figure 5:
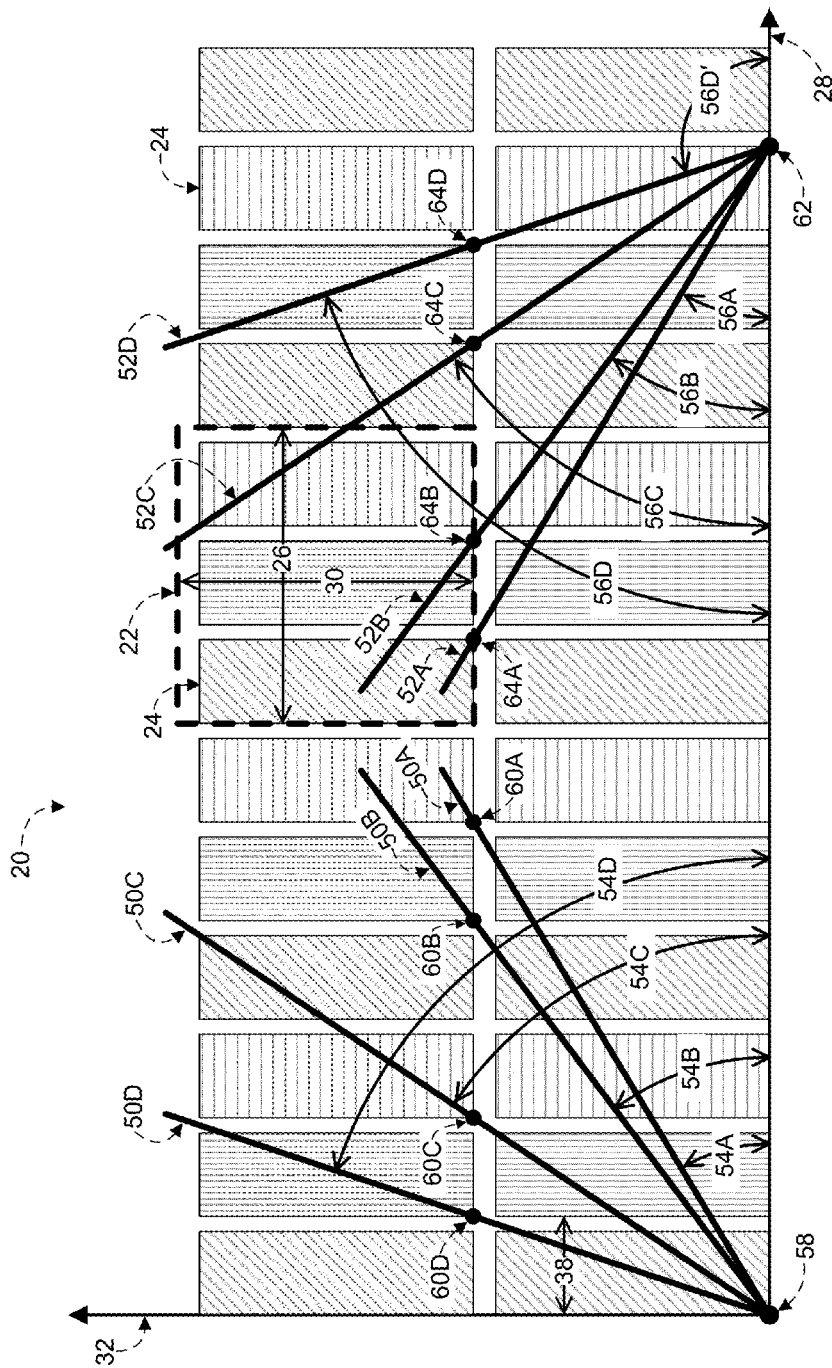
FIG. 5 illustrates another example portion of an example display with example conductive lines overlying the display portion.

FIG. 5 illustrates another example portion 20 of an example display with example conductive lines 50 and 52 overlying the display portion 20. FIG. 5 illustrates four example conductive lines 50A, 50B, 50C, and 50D oriented at angles 54A, 54B, 54C, and 54D, respectively, relative to horizontal axis 28. FIG. 5 also illustrates another four example conductive lines 52A, 52B, 52C, and 52D oriented at angles 56A, 56B, 56C, and 56D, respectively, relative to horizontal axis 28. Conductive lines 50 are oriented at angles 54 in a counterclockwise direction relative to horizontal axis 28, while conductive lines 52 are oriented at angles 56 in a clockwise direction relative to horizontal axis 28. In particular embodiments, a mesh design may include two sets of conductive lines, where the first set includes conductive lines that are substantially parallel and have a counterclockwise orientation with respect to horizontal axis 28 at an angle 54A, 54B, 54C, or 54D, and the second set includes conductive lines that are substantially parallel and have a clockwise orientation with respect to horizontal axis 28 at an angle 56A, 56B, 56C, or 56D. In the example of FIG. 5, each pixel 22 includes three sub-pixels 24, and each of the three sub-pixels 24 of a pixel 22 may correspond to a particular color, such as for example, red, green, or blue.

In the example of FIG. 5, each angle 54 of conductive lines 50 may be illustrated by drawing a line passing through reference point 58 and one of reference points 60A, 60B, 60C, or 60D. In FIG. 5, reference point 58 is located at a lower-left corner of a sub-pixel 24, and reference points 60A, 60B, 60C, and 60D are each located at lower-left corners of other sub-pixels 24. Relative to reference point 58, reference points 60A, 60B, 60C, and 60D are located one vertical pixel pitch 30 in the direction of vertical axis 32 and an integer number of horizontal sub-pixel pitches 38 in the direction of horizontal axis 28 (e.g., to the right in FIG. 5). Similarly, each angle 56 of conductive lines 52 may be illustrated by drawing a line passing through reference point 62 and one of reference points 64A, 64B, 64C, or 64D. In the example of FIG. 5, reference point 62 is located at a lower-right corner of a sub-pixel 24, and reference points 64A, 64B, 64C, and 64D are each located at lower-right corners of other sub-pixels 24. Relative to reference point 62, reference points 64A, 64B, 64C, and 64D are located one vertical pixel pitch 30 in the direction of vertical axis 32 and an integer number of horizontal sub-pixel pitches 38 in the direction opposite to horizontal axis 28 (e.g., to the left in FIG. 5).

In FIG. 5, the slope of a conductive line 50 may be defined as a vertical rise of conductive line 50 divided by a horizontal run of conductive line 50, and angle 54 can be found from the arctangent of the slope. In the example of FIG. 5, the vertical rise of conductive lines 50 is vertical pixel pitch 30 ($PP_y$), and the horizontal run of conductive lines 50 is an integer multiple of $SPP_x$ 38, which may be expressed as $m \times SPP_x$, where m is a positive integer. Since, as described above, $$SPP_x = \frac{1}{3} \times PP_x,$$

the horizontal run of conductive lines 50 may be expressed as $$m \times \frac{1}{3} \times PP_x.$$

As an example and not by way of limitation, for conductive line 50B in FIG. 5, m equals 4 since reference point 60B is located 4 horizontal sub-pixel pitches 38 to the right of reference point 58, and the horizontal run of conductive line 54B is $$\frac{4}{3} \times PP_x.$$

In particular embodiments, the slope of conductive lines 50 may be expressed as $$PP_y \Big/ \left( m \times \frac{1}{3} \times PP_x \right),$$

where m is a positive integer, and angle 54 ($\Theta_{54}$) can be found from the expression $$\theta_{54} = \arctan\left[ PP_y \Big/ \left( m \times \frac{1}{3} \times PP_x \right) \right] = \arctan\left[ \frac{3}{m} \times \frac{PP_y}{PP_x} \right].$$

In FIG. 5, for angles 54A, 54B, 54C, and 54D, m is equal to 5, 4, 2, and 1, respectively, and angles 54A, 54B, 54C, and 54D may be expressed as $$\theta_{54A} = \arctan\left[ \frac{3}{5} \times \frac{PP_y}{PP_x} \right], \theta_{54B} = \arctan\left[ \frac{3}{4} \times \frac{PP_y}{PP_x} \right],$$

$$\theta_{54C} = \arctan\left[ \frac{3}{2} \times \frac{PP_y}{PP_x} \right], \text{ and } \theta_{54D} = \arctan\left[ 3 \times \frac{PP_y}{PP_x} \right],$$

respectively. In particular embodiments, pixel 22 may have a substantially square shape, and $PP_x$ and $PP_y$ may be approximately equal. For such pixels 22 with a square shape, angles 54A, 54B, 54C, and 54D may then be expressed as $\theta_{54A}$=arc tan(3/5)≅30.96°, $\theta_{54B}$=arc tan(3/4)≅36.87°, $\theta_{54C}$=arc tan(3/2)≅56.31°, and $\theta_{54D}$=arc tan(3)≅71.57°, respectively.

In FIG. 5, the slope of a conductive line 52 may similarly be defined as a vertical rise of conductive line 52 divided by a horizontal run of conductive line 52, and angle 56 can be found from the arctangent of the slope. In the example of FIG. 5, the vertical rise of conductive lines 52 is vertical pixel pitch 30 ($PP_y$), and the horizontal run of conductive lines 50 is an integer multiple of $SPP_x$ 38, which may be expressed as $n \times SPP_x$, where n is a positive integer. Since, as described above, $$SPP_x = \frac{1}{3} \times PP_x,$$

the horizontal run of conductive lines 52 may be expressed as $$n \times \frac{1}{3} \times PP_x.$$

As an example and not by way of limitation, for conductive line 52C in FIG. 5, n equals 2 since reference point 64C is located 2 horizontal sub-pixel pitches 38 to the left of reference point 62, and the horizontal run of conductive line 52C is $$\frac{2}{3} \times PP_x.$$

In particular embodiments, the slope of conductive lines 52 may be expressed as $$PP_y \Big/ \left( n \times \frac{1}{3} \times PP_x \right),$$

where n is a positive integer, and angle 56 ($\Theta_{56}$) can be found from the expression $$\theta_{56} = \arctan\left[ PP_y \Big/ \left( n \times \frac{1}{3} \times PP_x \right) \right] = \arctan\left[ \frac{3}{n} \times \frac{PP_y}{PP_x} \right].$$

In particular embodiments, the positive integers m and n may be referred to as angle parameters for a mesh pattern. In FIG. 5, for angles 56A, 56B, 56C, and 56D, n is equal to 5, 4, 2, and 1, respectively, and angles 56A, 56B, 56C, and 56D may be expressed as $$\theta_{56A} = \arctan\left[\frac{3}{5} \times \frac{PP_y}{PP_x}\right], \theta_{56B} = \arctan\left[\frac{3}{4} \times \frac{PP_y}{PP_x}\right],$$

$$\theta_{56C} = \arctan\left[\frac{3}{2} \times \frac{PP_y}{PP_x}\right], \text{ and } \theta_{56D} = \arctan\left[3 \times \frac{PP_y}{PP_x}\right],$$

respectively. In particular embodiments, pixel 22 may have a substantially square shape, and $PP_x$ and $PP_y$ may be approximately equal. For such pixels 22 with a square shape, angles 56A, 56B, 56C, and 56D may then be expressed as $\theta_{56A}$=arctan (3/5)≅30.96°, $\theta_{56B}$=arc tan(3/4)≅36.87°, $\theta_{56C}$=arc tan(3/2)≅56.31°, and $\theta_{56D}$=arc tan(3)≅71.57°, respectively. In particular embodiments, angles 54A, 54B, 54C, and 54D may have the same magnitude as angles 56A, 56B, 56C, and 56D, respectively. In particular embodiments, a mesh design may include angles 54 and 56 with approximately the same magnitude, and the associated conductive lines 50 and 52 may appear to be reflected about a vertical axis.

In FIG. 5, conductive lines 52 may be described as having a $\theta_{56}$ clockwise orientation with respect to horizontal axis 28. In particular embodiments, conductive lines 52 may be described as having a $\theta'_{56}$ counterclockwise orientation with respect to horizontal axis 28, where $\theta'_{56}$ is the supplementary angle of $\theta_{56}$ such that $\theta'_{56}$=180−$\theta_{56}$. In FIG. 5, angle 56D is indicated along with its supplementary angle 56D'. As an example and not by way of limitation, if pixel 22 has a substantially square shape, conductive line 52A may be described as having a $\theta'_{56A}$ counterclockwise orientation with respect to horizontal axis, where $\theta'_{56A}$≅180°−30.96°=149.04°. Similarly, for substantially square pixels 22, conductive lines 52B, 52C, and 52D may be described as having a $\theta'_{56}$ counterclockwise orientation with respect to horizontal axis, where $\theta'_{56B}$≅143.13°, $\theta'_{56C}$≅123.69°, and $\theta'_{56D}$≅108.43°, respectively.

In particular embodiments, a mesh design may be formed or described by selecting an angle 54 for a first set of conductive lines 50 and selecting another angle 56 for a second set of conductive lines 52. For the first set of conductive lines 50 of a mesh design, angle 54 may be determined from the expression above for $\theta_{54}$, where m is 1, 2, 3, 4, 5, 6, 7, or any suitable positive integer. Similarly, for the second set of conductive lines 52 of a mesh design, angle 56 may be determined from the expression above for $\theta_{56}$, where n is 1, 2, 3, 4, 5, 6, 7, or any suitable positive integer. In particular embodiments, m and n may be the same, and angles $\theta_{54}$ and $\theta_{56}$ may be the same. In particular embodiments, m and n may be different, and angles $\theta_{54}$ and $\theta_{56}$ may be different. In particular embodiments, conductive lines 50 and 52 may make up part of a mesh pattern of a touch sensor and angles $\theta_{54}$ and $\theta_{56}$ may vary by up to 0.2°, 0.5°, 1°, or any suitable angular amount from the values calculated in the expressions above without substantially degrading the optical performance of the mesh pattern. In particular embodiments, a mesh pattern for a display with substantially square pixels 22 may include conductive lines 50 with angle 54 that is within 1° of 30.96°, 36.87°, 56.31°, or 71.57° and conductive lines 52 with angle 56 that is within 1° of 30.96°, 36.87°, 56.31°, or 71.57°. As an example and not by way of limitation, a mesh pattern for a display with substantially square pixels 22 may include conductive lines 50 with angle 54 that is within 1° of 36.87° (e.g., between 35.87° and 37.87°), and conductive lines 52 with angle 56 that is within 1° of 56.31° (e.g., between 55.31° and 57.31°). As another example and not by way of limitation, a mesh pattern for a display with substantially square pixels 22 may include conductive lines 50 and 52 with angles 54 and 56, respectively, that are within 1° of 36.87°. As other examples and not by way of limitation, a mesh pattern may include conductive lines 50 and 52 that are within 1° of any of the following combinations of angles 54 and 56, respectively: 30.96° and 56.31°; 36.87° and 71.57°; or 30.96° and 71.57°. Although this disclosure describes and illustrates particular conductive lines having particular angles with respect to a particular axis of a display, this disclosure contemplates any suitable conductive lines having any suitable angles with respect to any suitable axes of a display.

Figure 6:
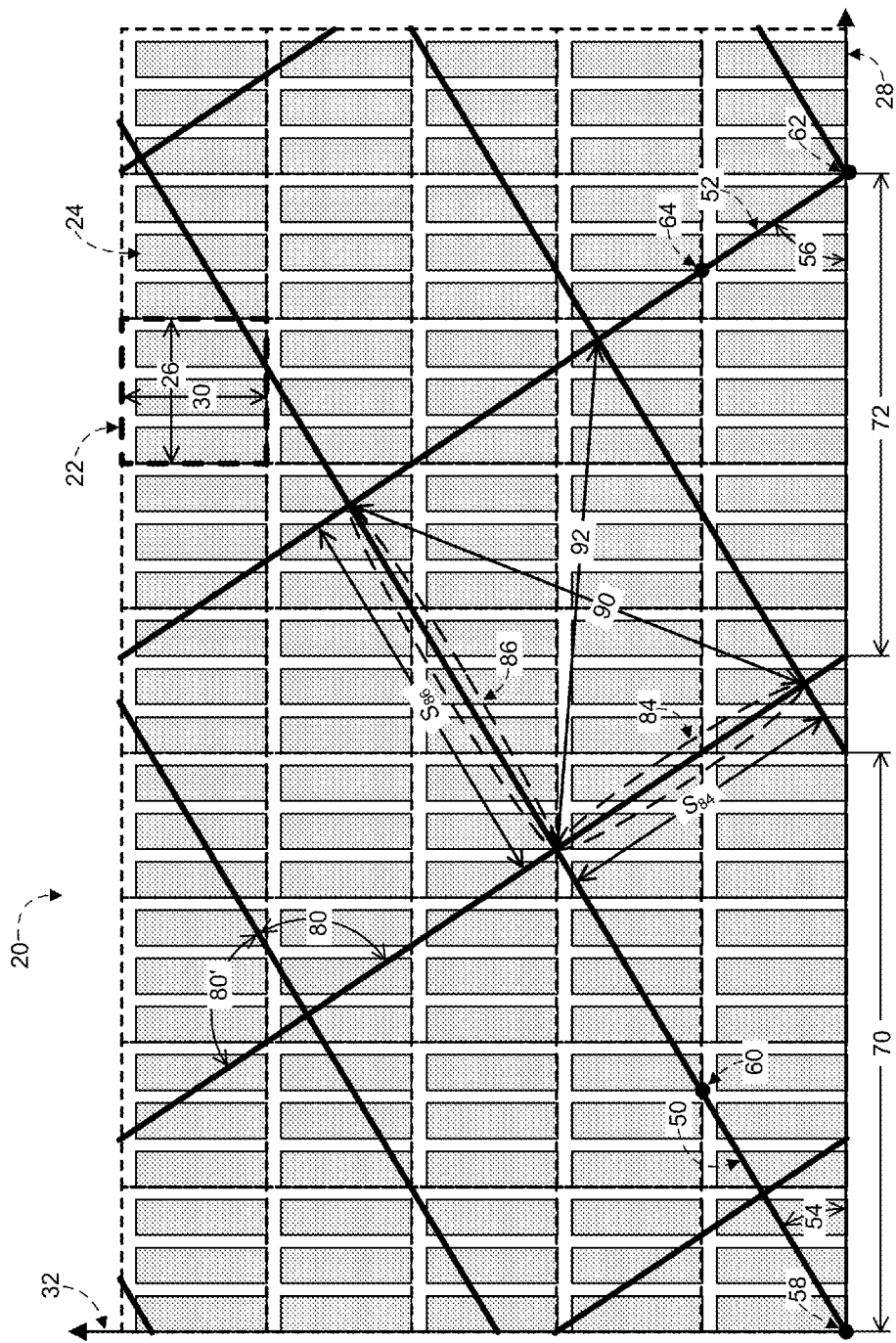
FIGS. 6-8 illustrate example mesh designs overlying example portions of example displays.
Figure 7:
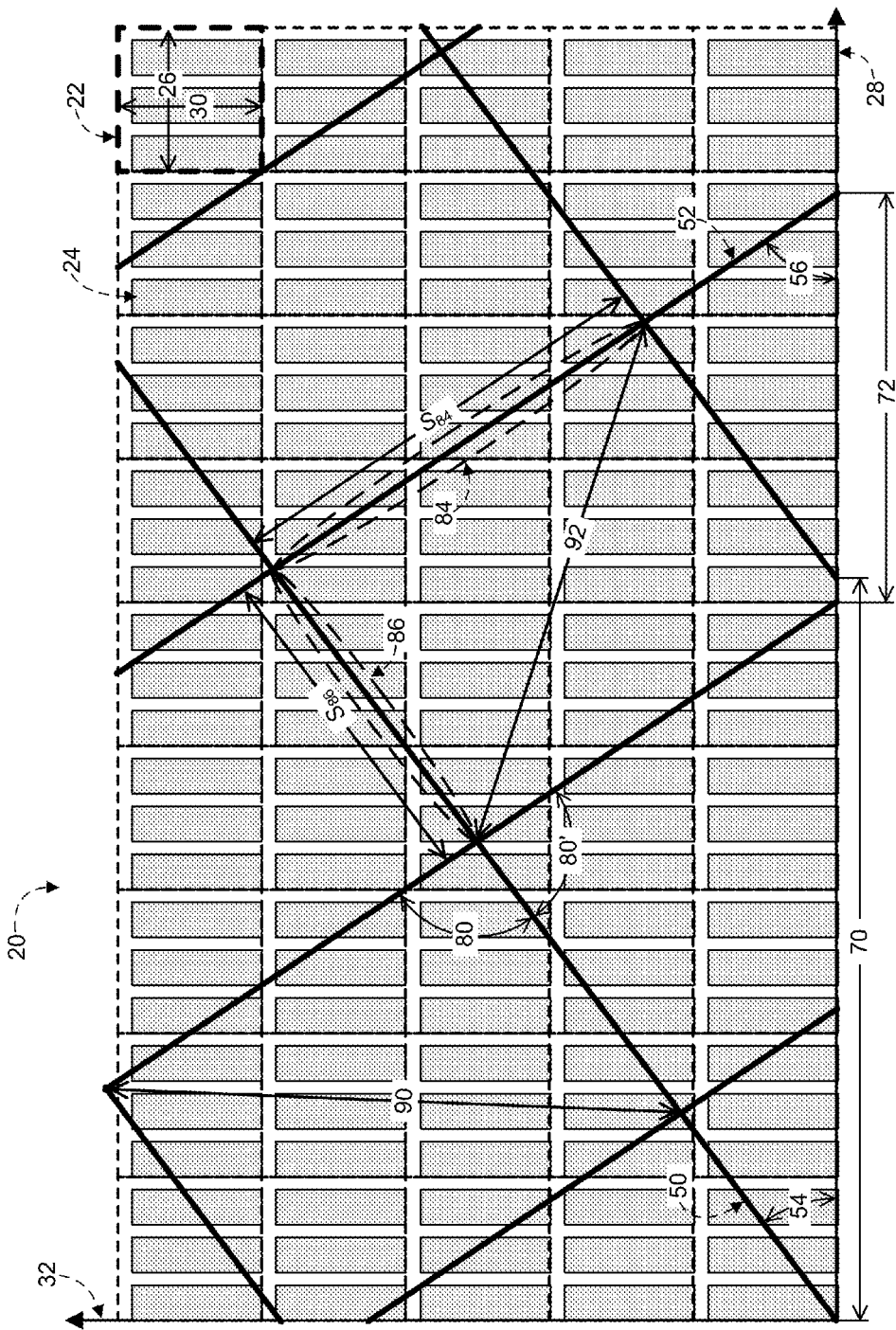
Figure 8:
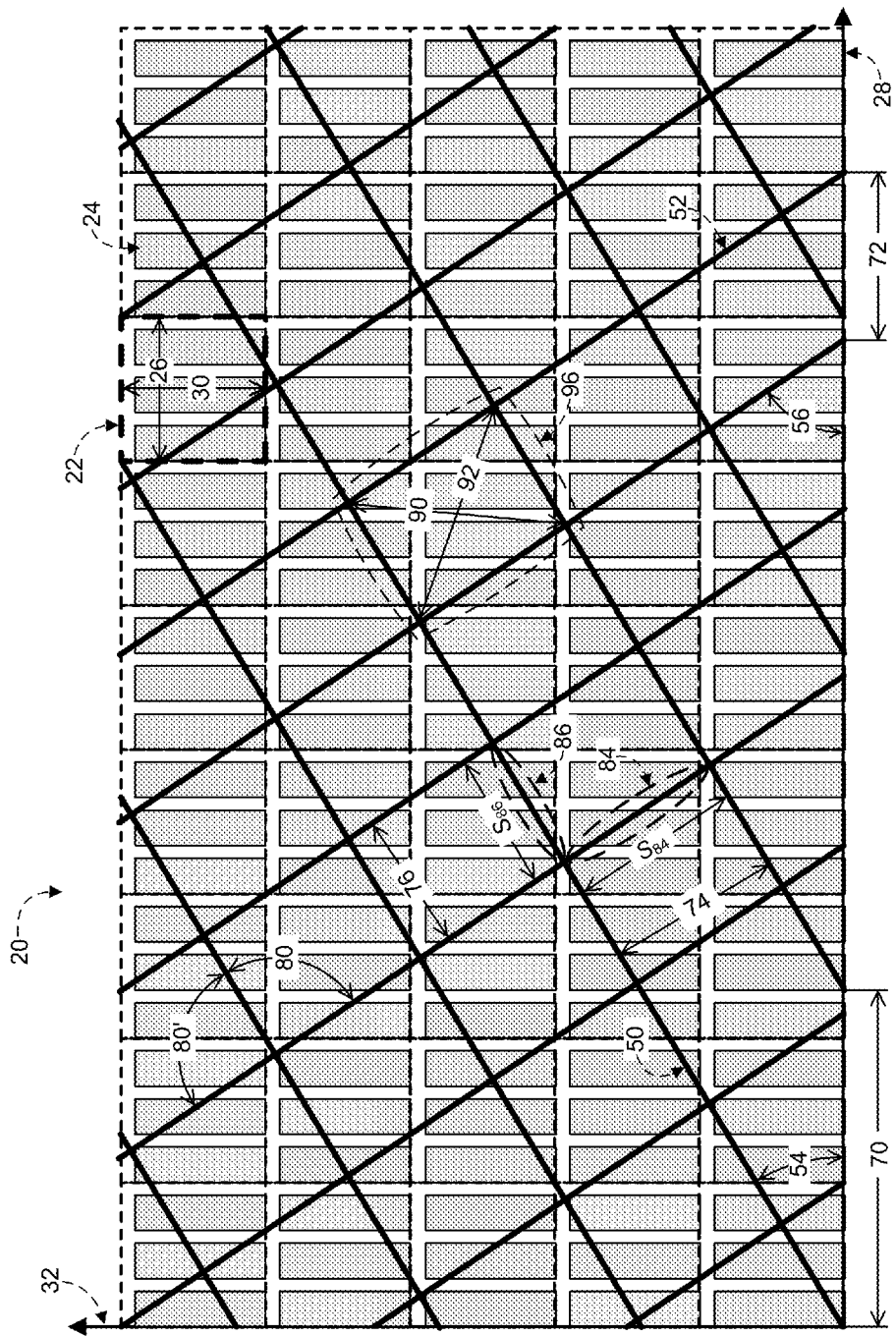

FIGS. 6-8 illustrate example mesh designs overlying example portions 20 of example displays. In particular embodiments, conductive lines 50 of a mesh design may have a horizontal separation distance 70 along horizontal axis 28 that may be expressed as $$D_{70} = \left(\frac{p}{3 \times q} \times PP_x\right),$$

where $D_{70}$ is horizontal separation distance 70 of conductive lines 50, p and q are positive integers, and $PP_x$ is horizontal pixel pitch 26. Similarly, in particular embodiments, conductive lines 52 of a mesh design may have a horizontal separation distance 72 along horizontal axis 28 that may be expressed as $$D_{72} = \left(\frac{r}{3 \times s} \times PP_x\right),$$

where $D_{72}$ is horizontal separation distance 72 of conductive lines 52, and r and s are positive integers. In particular embodiments, the integers p, q, r, and s may be referred to as line-separation parameters. In particular embodiments, line-separation parameters p, q, r, and s may be limited to a particular range of values or may be less than or equal to one or more particular maximum values. As an example and not by way of limitation, each of the line-separation parameters p, q, r, and s for one or more particular mesh designs may be less than or equal to 10, 20, 40, 50, 100, or any other suitable maximum value. As another example and not by way of limitation, the line-separation parameters p and r, which are both in the numerator of the respective expressions above, may each be less than or equal to a particular maximum value, such as for example, 10, 20, 40, 50, 100, or any other suitable maximum value. Similarly, the line-separation parameters q and s, which are both in the denominator of the respective expressions above, may each be less than or equal to another particular maximum value, such as for example, 1, 2, 3, 4, 5, 6, 10, 20, 30, 40, 50, 100, or any other suitable maximum value. Although this disclosure describes and illustrates particular mesh designs having particular line-separation parameters (p, q, r, and s) and particular maximum values for line-separation parameters, this disclosure contemplates any suitable mesh design having any suitable line-separation parameters and any suitable maximum values for line-separation parameters. In particular embodiments, angles 54 ($\theta_{54}$) and 56 ($\theta_{56}$) and separation distances 70 ($D_{70}$) and 72 ($D_{72}$) may be referred to as mesh-design parameters. A set of these four mesh-design parameters ($\theta_{54}$, $\theta_{56}$, $D_{70}$, and $D_{72}$) may be used to specify, at least in part, an arrangement (e.g., angles and spacings) of conductive lines 50 and 52 for a particular mesh design.

TABLE 1 below lists sets of mesh-design parameters that correspond to various mesh designs that may be used to form a touch sensor. Each set of mesh-design parameters in TABLE 1 corresponds to a particular mesh design. As an example and not by way of limitation, mesh design 1 from TABLE 1 has angle 54 of 30.96°, angle 56 of 56.31°, separation distance 70 of 4×PP$_x$, and separation distance 72 of $$\frac{10}{3} \times PP_x.$$

TABLE 1

| Mesh Design | Angle 54 ($\Theta_{54}$) [deg] | Separation Distance 70 ($D_{70}$) [PP$_x$] | Angle 56 ($\Theta_{56}$) [deg] | Separation Distance 72 ($D_{72}$) [PP$_x$] |
|---|---|---|---|---|
| 1 | 30.96 | 4 | 56.31 | 10/3 |
| 2 | 30.96 | 4 | 56.31 | 8/3 |
| 3 | 30.96 | 4 | 56.31 | 7/3 |
| 4 | 30.96 | 4 | 56.31 | 11/3 |
| 5 | 36.87 | 4 | 56.31 | 7/3 |
| 6 | 30.96 | 3 | 56.31 | 14/9 |
| 7 | 30.96 | 3 | 56.31 | 13/9 |
| 8 | 30.96 | 19/6 | 56.31 | 19/12 |
| 9 | 30.96 | 26/9 | 56.31 | 4/3 |
| 10 | 36.87 | 31/6 | 56.31 | 17/6 |
| 11 | 36.87 | 13/3 | 56.31 | 10/3 |
| 12 | 30.96 | 31/6 | 56.31 | 11/3 |
| 13 | 30.96 | 27/6 | 56.31 | 11/3 |
| 14 | 30.96 | 16/3 | 56.31 | 11/3 |
| 15 | 30.96 | 41/18 | 56.31 | 14/9 |
| 16 | 30.96 | 19/9 | 56.31 | 14/9 |
| 17 | 36.87 | 37/18 | 56.31 | 14/9 |
| 18 | 36.87 | 35/18 | 56.31 | 14/9 |
| 19 | 30.96 | 17/6 | 56.31 | 13/9 |
| 20 | 30.96 | 7/3 | 56.31 | 14/9 |
| 21 | 30.96 | 23/9 | 56.31 | 14/9 |
| 22 | 30.96 | 43/18 | 56.31 | 14/9 |
| 23 | 36.87 | 5/3 | 56.31 | 5/3 |
| 24 | 36.87 | 5/3 | 56.31 | 16/9 |
| 25 | 36.87 | 20/9 | 56.31 | 14/9 |
| 26 | 36.87 | 5/9 | 56.31 | 31/18 |
| 27 | 36.87 | 13/6 | 56.31 | 13/9 |
| 28 | 36.87 | 16/9 | 56.31 | 11/6 |
| 29 | 36.87 | 41/18 | 56.31 | 14/9 |
| 30 | 30.96 | 14/3 | 56.31 | 7/3 |
| 31 | 36.87 | 13/3 | 56.31 | 8/3 |
| 32 | 30.96 | 7/3 | 56.31 | 7/6 |
| 33 | 36.87 | 5/3 | 56.31 | 13/9 |
| 34 | 36.87 | 11/6 | 56.31 | 7/6 |
| 35 | 30.96 | 4 | 56.31 | 13/6 |
| 36 | 30.96 | 3 | 56.31 | 8/3 |
| 37 | 36.87 | 23/6 | 56.31 | 17/6 |
| 38 | 36.87 | 34/9 | 56.31 | 11/6 |
| 39 | 36.87 | 29/9 | 56.31 | 11/6 |
| 40 | 30.96 | 35/9 | 56.31 | 11/6 |
| 41 | 30.96 | 4 | 56.31 | 17/9 |
| 42 | 30.96 | 35/9 | 56.31 | 7/3 |
| 43 | 30.96 | 25/6 | 56.31 | 17/6 |
| 44 | 30.96 | 14/3 | 56.31 | 8/3 |
| 45 | 36.87 | 4 | 56.31 | 8/3 |

The first column in TABLE 1 is labeled "Mesh Design" and contains a number for identifying each of the 45 sets of mesh-design parameters listed in TABLE 1. The next four columns specify, for each mesh design, the four corresponding mesh-design parameters ($\theta_{54}$, $\theta_{56}$, D$_{70}$, and D$_{72}$). The columns for angles 54 and 56 are given in angular units of degrees (deg), and the angles given in TABLE 1 may be determined as described above, where $$\theta_{54} = \arctan\left[\frac{3}{m} \times \frac{PP_y}{PP_x}\right], \text{ and } \theta_{56} = \arctan\left[\frac{3}{n} \times \frac{PP_y}{PP_x}\right].$$

In particular embodiments, the mesh designs listed in TABLE 1 may be used with displays having pixels 22 with a substantially square shape so that PP$_x$ and PP$_y$ may be approximately equal. In this case, angle 54 may be determined from the expression $\theta_{54}$=arc tan[3/m], where m is any suitable integer, and angle 56 may be determined from the expression $\theta_{56}$=arc tan[3/n], where n is any suitable integer. Angle 54 in TABLE 1 is based on m=4 or 5 so that $\theta_{54}$=36.87° or 30.96°, respectively. Angle 56 in TABLE 1 is based on n=2 so that $\theta_{56}$=56.31°. In particular embodiments, angle 54 and angle 56 of a mesh design may vary by up to 0.2°, 0.5°, 1°, or any suitable angular amount from the values listed in TABLE 1 without substantially degrading the optical performance of a corresponding mesh pattern. As an example and not by way of limitation, for mesh design 5, angle 54 may be within 1° of 36.87° (e.g., angle 54 may be between 35.87° and 37.87°), and angle 56 may be within 1° of 56.31° (e.g., angle 56 may be between 55.31° and 57.31°).

In TABLE 1, the columns for separation distances 70 and 72 are given in units of horizontal pixel pitch 26 (PP$_x$). As an example and not by way of limitation, for mesh design 17, separation distance 70 is $$D_{70} = \left(\frac{p}{3 \times q} \times PP_x\right),$$

where p=37 and q=6, so that $$D_{70} = \frac{37}{18} \times PP_x.$$

For mesh design 13, separation distance 72 is $$D_{72} = \left(\frac{r}{3 \times s} \times PP_x\right),$$

where r=14 and s=3, so that $$D_{72} = \frac{14}{9} \times PP_x.$$

In particular embodiments, separation distances 70 and 72 listed in TABLE 1 may vary by up to 0.5%, 1%, 2%, 3%, or by any suitable percentage. Although this disclosure describes and TABLE 1 lists particular mesh designs having particular mesh-design parameters, this disclosure contemplates any suitable mesh design having any suitable mesh-design parameters.

Each of the example mesh designs illustrated in FIGS. 6-8 corresponds to a particular example mesh design from TABLE 1. Display portions 20 include pixels 22 arranged along horizontal axis 28 and vertical axis 32. In FIGS. 6-8, each pixel 22 has horizontal pixel pitch 26 (PP$_x$) and vertical pixel pitch 30 (PP$_y$), and each pixel 22 includes three sub-pixels 24. In FIGS. 6-8, each of the three sub-pixels 24 of a pixel 22 may correspond to a particular color, such as for example, red, green, or blue. Pixels 22 in FIGS. 6-8 are substantially square so that PP$_x$ and PP$_y$ are approximately the same. The example mesh designs in FIGS. 6-8 include conductive lines 50 and 52, and conductive lines 50 and 52 may be FLM and may make up part of a mesh pattern of an electrode of a touch sensor. Conductive lines 50 in each of FIGS. 6-8 are substantially parallel to each other, and each conductive line 50 forms an angle 54 relative to horizontal axis 28. Additionally, conductive lines 50 are substantially evenly spaced from one another with adjacent conductive lines 50 having an equal horizontal separation distance 70 along horizontal axis 28. Conductive lines 52 in FIGS. 6-8 are also substantially parallel to each other, forming an angle 56 relative to horizontal axis 28. Conductive lines 52 are also substantially evenly spaced from one another with adjacent conductive lines 52 having an equal horizontal separation distance 72.

In FIGS. 6-8, pixels 22 are approximately square (e.g., $PP_x \cong PP_y$), and as described above, angle 54 may be determined from the expression $\theta_{54}$=arc tan[3/m], and angle 56 may be determined from the expression $\theta_{56}$=arc tan[3/n]. For the example mesh designs illustrated in FIGS. 6-8, angles 54 are based on m=4 or 5 so that $\theta_{54}$=36.87° or 30.96°, respectively, and angle 56 is based on n=2 so that $\theta_{56}$=56.31°. In particular embodiments, angles 54 and 56 may vary by up to 0.2°, 0.5°, 1°, or any suitable angular amount from these values without substantially degrading the optical performance of the mesh pattern.

In FIGS. 6-8, conductive lines 50 have a horizontal separation distance 70 along horizontal axis 28 that may be expressed as $$D_{70} = \left(\frac{p}{3 \times q} \times PP_x\right),$$

where $D_{70}$ is horizontal separation distance 70 of conductive lines 50, p and q are positive integers, and $PP_x$ is horizontal pixel pitch 26. Similarly, in FIGS. 6-8, conductive lines 52 have a horizontal separation distance 72 along horizontal axis 28 that may be expressed as $$D_{72} = \left(\frac{r}{3 \times s} \times PP_x\right),$$

where $D_{72}$ is horizontal separation distance 72 of conductive lines 52, and r and s are positive integers. In particular embodiments, separation distances 70 and 72 may vary by up to 0.5%, 1%, 2%, 3%, or by any suitable percentage without substantially degrading the optical performance of the mesh pattern.

The example mesh design illustrated in FIG. 6 is based on mesh design 1 of TABLE 1 with the following mesh-design parameters: angle 54 is 30.96°; angle 56 is 56.31°; separation distance 70 is $4 \times PP_x$; and separation distance 72 is $$\frac{10}{3} \times PP_x.$$

For mesh design 1 illustrated in FIG. 6, separation distance 70 may be expressed as $$D_{70} = \left(\frac{p}{3 \times q} \times PP_x\right),$$

where p=12 and q=1, so that $D_{70}=4 \times PP_x$. Similarly, separation distance 72 may be expressed as $$D_{72} = \left(\frac{r}{3 \times s} \times PP_x\right),$$

where r=10 and s=1, so that $$D_{72} = \frac{10}{3} \times PP_x.$$

In FIG. 6, angle 80 ($\theta_{80}$), which is the sum of angles 54 and 56 ($\theta_{80}=\theta_{54}+\theta_{56}$, is approximately 30.96°+56.31°=87.27°. Angle 80' ($\theta'_{80}$) is the supplement to angle 80, so that angle 80' is $\theta'_{80}=180°-\theta_{80}\cong 92.73°$. In particular embodiments, the mesh design of FIG. 6 may be preferable for a display where $PP_x$ and $PP_y$ are in the range of approximately 80 μm to 96 μm. As an example and not by way of limitation, the mesh design of FIG. 6 may be used with a display where $PP_x \cong PP_y \cong 93$ μm. In this case, separation distance 70 is approximately $D_{70}=4 \times 93$ μm=372 μm, and separation distance 72 is approximately $$D_{72} = \frac{10}{3} \times 93 \; \mu m = 310 \; \mu m.$$

From the expressions above for the lengths of segments 84 and 86, length of line segment 84 is approximately $$S_{84} = D_{70} \times \frac{\sin\theta_{54}}{\sin\theta'_{80}} \cong 191.6 \; \mu m,$$

and length of line segment 86 is approximately $$S_{86} = D_{72} \times \frac{\sin\theta_{56}}{\sin\theta'_{80}} \cong 258.2 \; \mu m.$$

From the expressions for diagonal lengths 90 and 92 discussed above, diagonal length 90 is approximately $D_{90} \cong 314.1$ μm, and diagonal length 92 is approximately $D_{92} \cong 328.8$ μm.

In particular embodiments, a single mesh design, such as for example any of the mesh designs listed in TABLE 1 and the mesh designs illustrated in FIGS. 6-8, may be used with two or more different displays, where the two or more different displays have substantially the same horizontal pixel pitch 26 and substantially the same vertical pixel pitch 30. In particular embodiments, a single mesh design may be used with two or more different displays even though the two or more different displays may have sub-pixels 24 with different shapes or dimensions. As an example and not by way of limitation, the mesh design of FIG. 6 may be used with two displays each having a pixel height and width of approximately 95 μm, where one of the displays has rectangular-shaped sub-pixels 24 and the other display has chevron-shaped sub-pixels 24. As another example and not by way of limitation, the mesh design of FIG. 6 may be used with two displays each having $PP_x \cong PP_y \cong 90$ μm, where one of the displays has sub-pixels 24 with a sub-pixel height 44 of $SPD_y \cong 83$ μm and the other display has a sub-pixel height 44 of $SPD_y = 76$ μm. Although this disclosure describes and illustrates a particular mesh design that may be used with two or more different displays, this disclosure contemplates any suitable mesh designs that may be used with any suitable number of suitable different displays.

The example mesh design illustrated in FIG. 7 is based on mesh design 10 of TABLE 1 with the following mesh-design parameters: angle 54 is 36.87°; angle 56 is 56.31°; separation distance 70 is $$\frac{31}{6} \times PP_x;$$

and separation distance 72 is $$\frac{17}{6} \times PP_x.$$

For mesh design 10 illustrated in FIG. 7, separation distance 70 may be expressed as $$D_{70} = \left(\frac{p}{3 \times q} \times PP_x\right),$$

where p=31 and q=2, so that $$D_{70} = \frac{31}{6} \times PP_x.$$

Similarly, separation distance 72 may be expressed as $$D_{72} = \left(\frac{r}{3 \times s} \times PP_x\right),$$

where r=17 and s=2, so that $$D_{72} = \frac{17}{6} \times PP_x.$$

In particular embodiments, the mesh design of FIG. 7 may be preferable for a display where $PP_x$ and $PP_y$ are in the range of approximately 70 μm to 81 μm. As an example and not by way of limitation, the mesh design of FIG. 7 may be used with a display where $PP_x \cong PP_y \cong 78$ μm. In this case, separation distance 70 is approximately $$D_{70} = \frac{31}{6} \times 78 \text{ μm} = 403 \text{ μm},$$

and separation distance 72 is approximately $$D_{72} = \frac{17}{6} \times 78 \text{ μm} = 221 \text{ μm}.$$

From the expressions above for the lengths of segments 84 and 86, length of line segment 84 is approximately $$S_{84} = D_{70} \times \frac{\sin\theta_{54}}{\sin\theta'_{80}} \cong 242.2 \text{ μm},$$

and length of line segment 86 is approximately $$S_{86} = D_{72} \times \frac{\sin\theta_{56}}{\sin\theta'_{80}} \cong 184.2 \text{ μm}.$$

From the expressions for diagonal lengths 90 and 92 discussed above, diagonal length 90 is approximately $D_{90} \cong 312.3$ μm, and diagonal length 92 is approximately $D_{92} \cong 296.0$ μm.

The example mesh design illustrated in FIG. 8 is based on mesh design 32 of TABLE 1 with the following mesh-design parameters: angle 54 is 30.96°; angle 56 is 56.31°; separation distance 70

$$\frac{7}{3} \times PP_x;$$

and separation distance 72 is $$\frac{7}{6} \times PP_x.$$

For mesh design 32 illustrated in FIG. 8, separation distance 70 may be expressed as $$D_{70} = \left(\frac{p}{3 \times q} \times PP_x\right),$$

where p=7 and q=1, so that $D_{70}=7/3 \times PP_x$. Similarly, separation distance 72 may be expressed as $$D_{72} = \left(\frac{r}{3 \times s} \times PP_x\right),$$

where r=7 and s=2, so that $$D_{72} = \frac{7}{6} \times PP_x.$$

In particular embodiments, the mesh design of FIG. 8 may be preferable for a display where $PP_x$ and $PP_y$ are in the range of approximately 185 μm to 215 μm. As an example and not by way of limitation, the mesh design of FIG. 8 may be used with a display where $PP_x=PP_y=202$ μm. In this case, separation distance 70 is approximately $$D_{70} = \frac{7}{3} \times 202 \text{ μm} = 471.3 \text{ μm},$$

and separation distance 72 is approximately $$D_{72} = \frac{7}{6} \times 202 \ \mu m = 235.7 \ \mu m.$$

From the expressions above for the lengths of segments 84 and 86, length of line segment 84 is approximately $$S_{84} = D_{70} \times \frac{\sin\theta_{54}}{\sin\theta_{80}} \cong 242.8 \ \mu m,$$

and length of line segment 86 is approximately $$S_{86} = D_{72} \times \frac{\sin\theta_{56}}{\sin\theta'_{80}} \cong 196.3 \ \mu m.$$

From the expressions for diagonal lengths 90 and 92 discussed above, diagonal length 90 is approximately $D_{90} \cong 304.8$ μm, and diagonal length 92 is approximately $D_{92} = 319.3$ μm. From the expressions for perpendicular separation distances 74 and 76 discussed above, perpendicular separation distance 74 is approximately $D_{74} = D_{70} \sin \theta_{54} = (471.3 \ \mu m) \times \sin(30.96°) \cong 242.5$ μm, and perpendicular separation distance 76 is approximately $D_{76} = D_{72} \sin \theta_{56} = (235.7 \ \mu m) \times \sin(56.31°) \cong 196.1$ μm.

In particular embodiments, conductive lines 50 and 52 may be substantially straight lines. In addition or as an alternative, in particular embodiments, non-linear conductive line patterns may be used to avoid long linear stretches of conductive metal with a repeat frequency, which non-linear patterns may reduce the appearance of optical interference or moiré patterns. In particular embodiments, one or more segments of one or more conductive lines 50 and 52 may have a variation in line direction or path from a straight line, including but not limited to, wavy, sinusoidal, or zig-zag lines. As an example and not by way of limitation, one or more segments of one or more conductive lines 50 and 52 may be substantially sinusoidal. In particular embodiments, conductive lines 50 and 52 may have a sinusoidal variation with a peak-to-peak amplitude between 0% and 10% of horizontal separation distance 70 or 72. As an example and not by way of limitation, a mesh pattern with a horizontal separation distance 70 of approximately 300 μm may have conductive lines 50 or 52 with a peak-to-peak sinusoidal amplitude between 0 μm and 30 μm. Additionally, in particular embodiments, conductive lines 50 may have a sinusoidal variation with a period on the order of segment length $S_{86}$ or perpendicular separation distance $D_{76}$. Similarly, in particular embodiments, conductive lines 52 may have a sinusoidal variation with a period on the order of segment length $S_{84}$ or perpendicular separation distance $D_{74}$. In particular embodiments, conductive lines 50 and 52 that include segments that are non-linear may have horizontal line separation distances 70 and 72 that may be determined based on an average horizontal line separation distance or based on a horizontal line separation distance between linear approximations to non-linear line segments. Although this disclosure describes and illustrates particular meshes that have particular conductive lines 50 and 52 with particular curves (e.g., substantially straight or substantially sinusoidal), this disclosure contemplates any suitable meshes that have any suitable conductive lines with any suitable curves.

Figure 9:
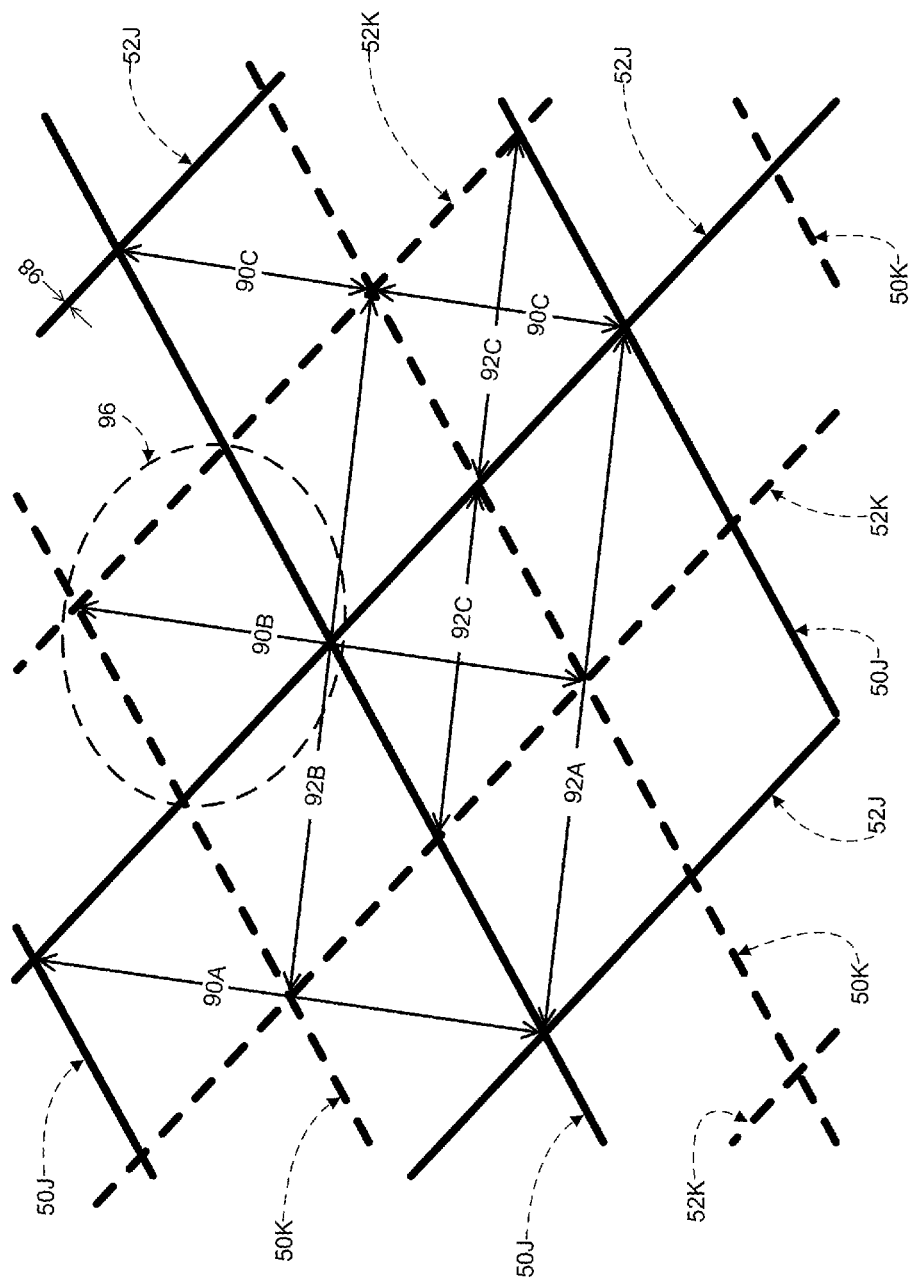
FIG. 9 illustrates example lines of an example mesh design.

FIG. 9 illustrates example lines 50 and 52 of an example mesh design. The mesh design in FIG. 9 is similar to the mesh designs in FIGS. 4 and 6-8. In particular embodiments, a mesh pattern may include two or more conductive lines 50 and 52. In particular embodiments, a mesh pattern may include on the order of 1, 10, 100, 1,000, or any suitable number of conductive lines 50 and 52. This disclosure contemplates any suitable mesh pattern that includes any suitable number of conductive lines. Example conductive lines 50 and 52 of FIG. 9 may overlie a display portion; for clarity of viewing conductive lines 50 and 52, pixels of a display portion are not shown in FIG. 9. Angles of conductive lines 50 and 52 and horizontal separation distances between adjacent conductive lines 50 and 52 in FIG. 9 may be determined in a manner similar to those described above. Conductive lines 50 and 52 in FIG. 9 may be FLM and may be part of a mesh pattern of a touch sensor. Conductive lines 50 in FIG. 9 are substantially parallel to each other and are substantially evenly spaced from one another with adjacent conductive lines 50 having an approximately equal horizontal separation distance. Conductive lines 52 in FIG. 9 are also substantially parallel to each other and are also substantially evenly spaced from one another with adjacent conductive lines 52 having an approximately equal horizontal separation distance.

A mesh pattern represented by conductive lines 50 and 52 in the examples of FIGS. 4 and 6-9 may have a single-layer, dual-layer, or suitable multi-layer configuration. Similarly, the mesh designs listed in TABLE may correspond to single-layer, dual-layer, or suitable multi-layer configurations. In particular embodiments, a single-layer mesh pattern may refer to a mesh pattern where conductive lines 50 and 52 are disposed on one side or surface of a substrate. In particular embodiments, a dual-layer mesh pattern may include a mesh pattern formed by conductive lines 50 and 52, disposed on one or more surfaces of one or more substrates. As an example and not by way of limitation, a dual-layer mesh pattern may have a first layer of conductive lines 50 and 52 disposed on one side or surface of a substrate and a second layer of conductive lines 50 and 52 disposed on another side or surface of the same substrate. As another example and not by way of limitation, a dual-layer mesh pattern may have a first layer of conductive lines 50 and 52 disposed on one surface of one substrate and a second layer of conductive lines 50 and 52 disposed on one surface of another substrate. This disclosure contemplates a touch sensor having a mesh pattern with any suitable number of layers of conductive lines 50 and 52. In such dual-layer (or multi-layer) touch-sensor configurations, one or more layers of conductive lines 50 and 52 may provide drive electrodes of the touch sensor and one or more other layers of conductive lines 50 and 52 may provide sense electrodes of the touch sensor. Although this disclosure describes and illustrates particular mesh designs having particular single-layer, dual-layer, or multi-layer configurations, this disclosure contemplates any suitable mesh design having any suitable single-layer, dual-layer, or multi-layer configuration.

The example mesh pattern of FIG. 9 may have a dual-layer configuration where conductive lines 50J and 52J (represented by solid lines) are included in a first layer disposed on one surface of a substrate, and conductive lines 50K and 52K (represented by dashed lines) are included in a second layer disposed on another surface of the same substrate or on a surface of another substrate. In FIG. 9, dashed lines 50K and 52K represent conductive lines that may be part of a particular layer, and, in particular embodiments, the conductive lines of a corresponding mesh pattern may be continuous conductive-line segments that are not dashed or broken, or may have a combination of continuous and broken conductive-line segments. Conductive lines 50K and 52K in FIG. 9 are represented by dashed lines only to visually distinguish them from conductive lines 50J and 52J. In particular embodiments, conductive lines 50 of a mesh pattern may be alternately disposed on the first or second layers of a dual-layer mesh pattern. In FIG. 9, conductive lines 50J may include a first group of every other line of conductive lines 50, and conductive lines 50J may be part of a first layer. Similarly, in FIG. 9, conductive lines 50K may include a second group (different from the first group) of every other line of conductive lines 50, and conductive lines 50K may be part of a second layer. As an example and not by way of limitation, if conductive lines 50 were sequentially identified by integers (e.g., 1, 2, 3, etc.), conductive lines 50J of a first layer may include all odd-numbered lines, and conductive lines 50K of a second layer may include all even-numbered lines. Similarly, in particular embodiments, conductive lines 52 of a mesh pattern may be alternately disposed on the first or second layers of a dual-layer mesh pattern. As an example and not by way of limitation, if conductive lines 52 were sequentially identified by integers, conductive lines 52J of a first layer may include all odd-numbered lines, and conductive lines 52K of a second layer may include all even-numbered lines. Although this disclosure describes and illustrates particular conductive lines disposed on particular layers of a multi-layer mesh pattern, this disclosure contemplates any suitable conductive lines disposed on any suitable layers of a multi-layer mesh pattern.

In particular embodiments, adjacent conductive lines 50 of the first layer may have a horizontal separation distance 70 along horizontal axis 28 that is substantially the same as a horizontal separation distance 70 of adjacent conductive lines 50 of the second layer. Similarly, in particular embodiments, adjacent conductive lines 52 of the first layer may have a horizontal separation distance 72 along horizontal axis 28 that is substantially the same as a horizontal separation distance 72 along of adjacent conductive lines 52 of the second layer. As an example and not by way of limitation, adjacent conductive lines 50 of a first layer may be separated from each other along horizontal axis 28 by a distance of approximately $8 \times PP_x$, and adjacent conductive lines 50 of the second layer may have approximately the same horizontal separation distance. Additionally, adjacent conductive lines 52 of a first layer may be separated from each other along horizontal axis 28 by a distance of approximately $$\frac{14}{3} \times PP_x,$$

and adjacent conductive lines 52 of the second layer may have approximately the same horizontal separation distance. Moreover, in such dual-layer touch-sensor configurations, a first layer of conductive lines 50 and 52 and a second layer of conductive lines 50 and 52 may be offset from each other by a specific distance along a specific direction. As an example and not by way of limitation, first and second layers of conductive lines may be offset from one another so that adjacent conductive lines 50 of the first and second layers are separated from each other along horizontal axis 28 by a distance of approximately $4 \times PP_x$, and adjacent conductive lines 52 of the first and second layers are separated from each other along horizontal axis by approximately $$\frac{7}{3} \times PP_x.$$

Although this disclosure describes multi-layer touch sensors with particular offsets between conductive lines of different layers, this disclosure contemplates multi-layer touch sensors with any suitable offsets between conductive lines of different layers.

In the example dual-layer mesh design of FIG. 9, conductive lines 50J and 52J of a first layer may form a pattern having diagonal lengths 90A and 92A, and conductive lines 50K and 52K of a second layer may form a pattern having a diagonal lengths 90B and 92B. In particular embodiments, diagonal lengths 90A and 90B may be approximately equal, and diagonal lengths 92A and 92B may be approximately equal. In particular embodiments, a dual-layer mesh design formed from a combination of first and second layers may have diagonal lengths 90C and 92C, where 90C is approximately one-half of 90A or 90B, and 92C is approximately one-half of 92A or 92B. In particular embodiments, diagonal lengths 90A and 92A may be referred to as first-layer diagonal lengths, and diagonal lengths 90B and 92B may be referred to as second-layer diagonal lengths. In particular embodiments, diagonal lengths 90C and 92C may be referred to as mesh-pattern diagonal lengths corresponding to a mesh pattern formed by the combination of the first and second layers. As an example and not by way of limitation, diagonal lengths 92A and 92B in FIG. 9 may be approximately 630 µm, and diagonal length 92C may be approximately 315 µm. In particular embodiments, for conductive-line widths of approximately 5 µm, it may be preferable for a dual-layer mesh design to have diagonal lengths 90A, 90B, 92A, and 92B in the range of approximately 530-680 µm and mesh-pattern diagonal lengths 90C and 92C in the range of approximately 265-340 µm. In other particular embodiments, for conductive-line widths of approximately 2.5 µm, it may be preferable for a dual-layer mesh design to have diagonal lengths 90A, 90B, 92A, and 92B in the range of approximately 265-340 µm and mesh-pattern diagonal length 90C and 92C in the range of approximately 132-170 µm. Although this disclosure describes and illustrates particular dual-layer mesh patterns with particular diagonal lengths, this disclosure contemplates any suitable dual-layer mesh patterns with any suitable diagonal lengths.

In particular embodiments, conductive lines 50 or conductive lines 52 of a dual-layer mesh pattern may have one or more portions disposed on a first layer and one or more portions disposed on a second layer of a dual-layer mesh pattern. In particular embodiments, a conductive line 50 or 52 may be separated into multiple distinct segments, where each segment is disposed on a first or second layer of a dual-layer mesh pattern. In particular embodiments, a conductive line 50 or 52 with multiple segments disposed on a first or second layer of a dual-layer mesh pattern may be viewed as a single, continuous line when seen from above a plane of the mesh pattern. As an example and not by way of limitation, a conductive line 50 may have three distinct portions: a first portion disposed on a first layer, a second portion disposed on a second layer, and a third portion disposed on the first layer. As another example and not by way of limitation, a mesh pattern may be split into three distinct areas, where the first and third areas are disposed on a first layer, and the second area is disposed on a second layer. Although this disclosure describes and illustrates mesh patterns having particular conductive lines with particular portions disposed on one or more surfaces, this disclosure contemplates any suitable mesh patterns having any suitable conductive lines with any suitable portions disposed on any suitable number of surfaces.

In FIG. 9, conductive-line width 98 illustrates a dimension corresponding to a line width of conductive line 52J. In particular embodiments, width 98 of conductive line 50 or 52 may be measured along a direction that is substantially orthogonal to the direction or extent of the conductive line. In particular embodiments, a mesh design may have conductive lines 50 and 52 with line widths 98 between approximately 4 µm and 6 µm or approximately 4.5 µm and 5.5 µm. As an example and not by way of limitation, conductive lines 50 and 52 of a mesh design may have widths 98 of approximately 5 µm. In other particular embodiments, a mesh design may have conductive lines 50 and 52 with line widths 98 between approximately 2 µm and 3 µm, approximately 2.5 µm and 3.5 µm, approximately 2.7 µm and 3.3 µm, or approximately 2.9 µm and 3.1 µm. As an example and not by way of limitation, conductive lines 50 and 52 of a mesh design may have widths 98 of approximately 3 µm. In particular embodiments, it may be preferable for a mesh design to have an optical transmission loss of less than approximately 5%. As an example and not by way of limitation, a mesh design having a metal density of approximately 4% may block approximately 4% of incident light. In particular embodiments, an optical transmission loss of less than approximately 5% may be achieved with a mesh design having conductive lines with line widths 98 of approximately 4 µm to 6 µm and diagonal length 90 or diagonal length 92 in the range of approximately 265-340 µm. As an example and not by way of limitation, an optical transmission loss of approximately 4% may be achieved with a mesh design having conductive-line widths 98 of approximately 5 µm and diagonal length 90 or diagonal length 92 in the range of approximately 265-340 µm. In other particular embodiments, an optical transmission loss of less than approximately 5% may be achieved with a mesh design having conductive lines with line widths 98 of approximately 2 µm to 3 µm or approximately 2.5 µm to 3.5 µm and diagonal length 90 or diagonal length 92 in the range of approximately 132-170 µm. As an example and not by way of limitation, an optical transmission loss of approximately 4% may be achieved with a mesh design having conductive-line widths 98 of approximately 3 µm and diagonal length 90 or diagonal length 92 in the range of approximately 132-170 µm. Although this disclosure describes and illustrates particular mesh patterns having particular conductive-line widths and particular diagonal lengths, this disclosure contemplates any suitable mesh patterns having any suitable conductive-line widths and any suitable diagonal lengths.

Figure 10:
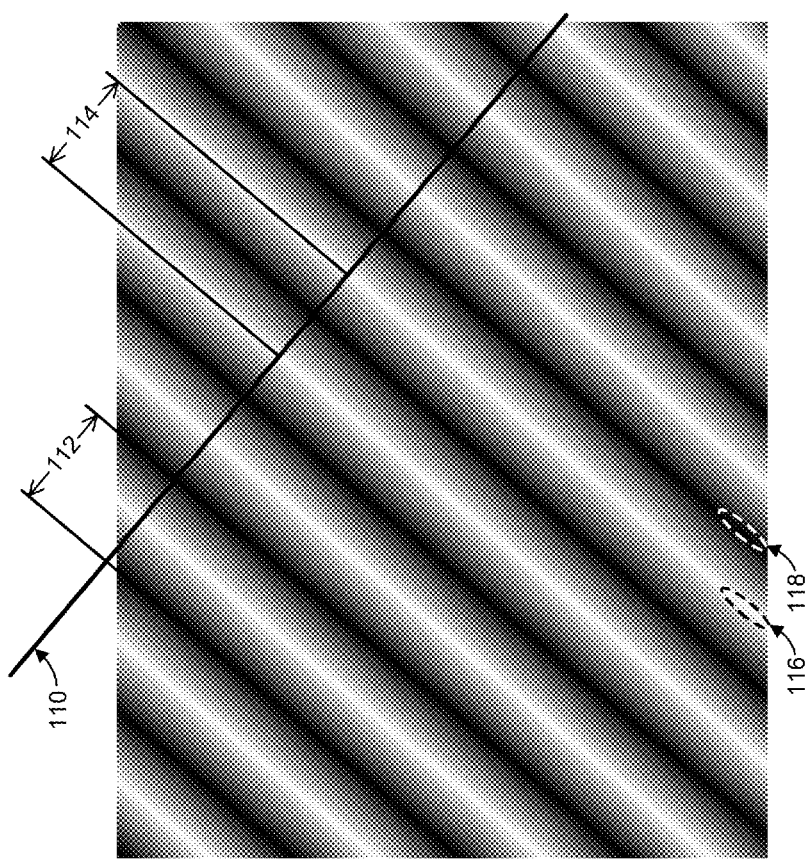
FIGS. 10-11 each illustrate example optical bands formed by a mesh pattern and a display.
Figure 11:
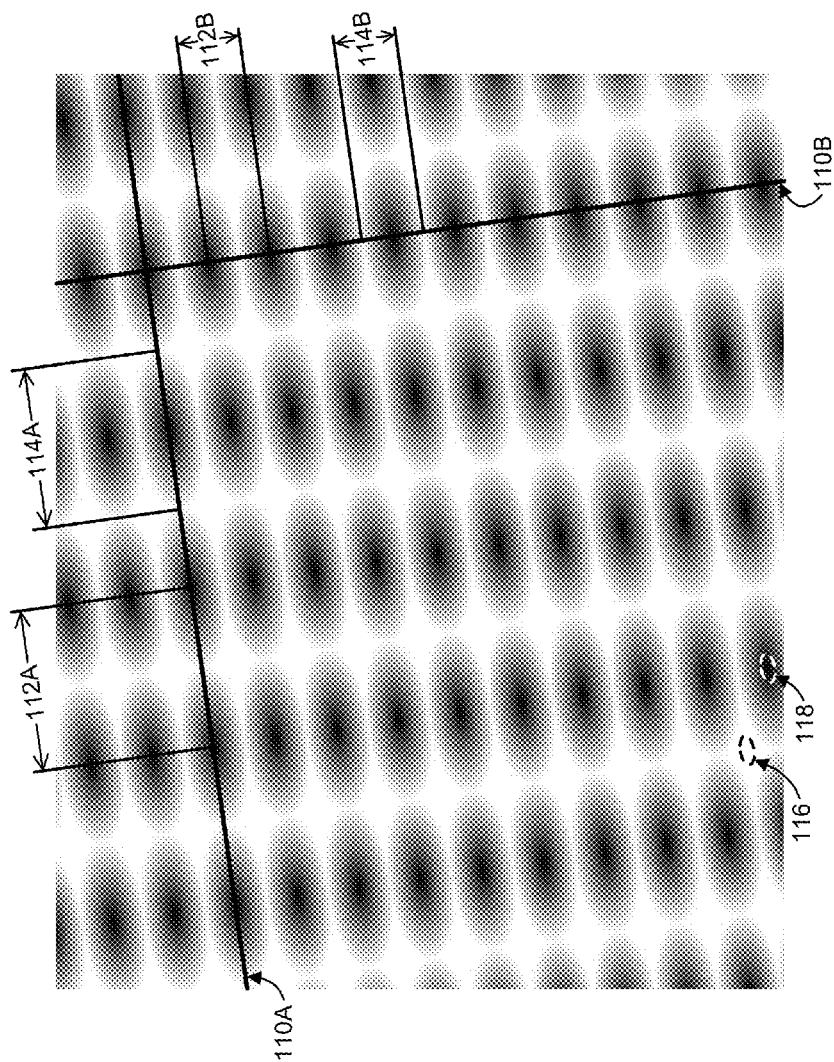

FIGS. 10-11 each illustrate example optical bands formed by a mesh pattern and a display. The example optical bands illustrated in FIGS. 10 and 11 may each be associated with different mesh patterns or displays. In FIGS. 10-11, the underlying mesh patterns and displays that produce the optical bands are not shown for clarity of illustrating the visual appearance of the optical bands (e.g., the variation in brightness of the optical bands). In particular embodiments, optical bands may appear as a series of bands, lines, regions, or fringes with a repeating brighter-darker pattern or a repeating alternating-color pattern. In particular embodiments, optical bands of a touch sensor-display combination may exhibit a relatively small or moderate variation in color or intensity (e.g., less than a 1%, 5%, or 10% difference in intensity between brighter and darker regions). For the example optical bands of FIGS. 10 and 11, the difference in brightness between brighter and darker regions may be exaggerated for clarity of illustrating the optical bands. Although this disclosure describes and illustrates particular optical bands having particular variations in intensity or color, this disclosure contemplates any suitable optical bands having any suitable variations in intensity or color.

In particular embodiments, optical bands may appear as spatial variations in optical intensity or color of light produced by a touch sensor-display combination. A touch sensor-display combination may refer to a touch-sensor mesh pattern overlaid onto a display. In particular embodiments, optical bands may be referred to as or may be associated with a moiré-pattern effect resulting from a mesh pattern being overlaid onto a display. In particular embodiments, optical bands or a moiré pattern may refer to a secondary and visually evident superimposed pattern that can result from a touch-sensor mesh pattern being overlaid over a repeating pixel pattern of a display. In particular embodiments, when overlaid over a display, one or more micro-features of a touch sensor (e.g., a touch-sensor mesh pattern) may, at least in part, determine an amount or a characteristic of optical bands or a moiré-pattern effect exhibited by the touch sensor-display combination. As an example and not by way of limitation, one or more parameters of a mesh design (e.g., $\theta_{54}$, $\theta_{56}$, $D_{70}$, or $D_{72}$) or a conductive-line width 98 may, at least in part, determine an amount of variation in intensity of optical bands. In particular embodiments, optical bands, such as for example those illustrated in FIGS. 10-11, may be observed by a user looking at a display and may appear as a waviness or a spatially dependent variation in intensity or color of a display.

In particular embodiments, optical bands may result from a repeating pattern of conductive lines 50 and 52 being superimposed onto a repeating pattern of pixels 22 or sub-pixels 24 of a display. In particular embodiments, conductive lines 50 and 52 may occlude light originating from pixels 22 or sub-pixels 24 of a display situated below a mesh pattern, and the pattern of occlusion associated with conductive lines 50 and 52 may result in optical bands that may be visible to a user looking at the display. As an example and not by way of limitation, a conductive line 50 or 52 located above a pixel 22 may occlude (or, block) some of the light emitted by each sub-pixel 24 of pixel 22. Another pixel with less or with no occlusion associated with conductive lines 50 or 52 may appear brighter than a pixel that has greater occlusion. A repeating pattern where conductive lines 50 and 52 occlude some pixels 22 or sub-pixels 24 more than others may result in the appearance of optical bands of varying intensity across a display. As another example and not by way of limitation, a pixel configured to appear white may have each of its constituent sub-pixels (e.g., red, green, and blue sub-pixels) configured to emit light that forms a substantially white pixel. For a particular pixel, a conductive line that occludes light emitted by a blue sub-pixel more than light emitted by a red or green sub-pixel may cause the pixel to appear slightly yellowish rather than substantially white. For another pixel, a conductive line that occludes more light emitted by blue and green sub-pixels than light emitted by a red sub-pixel may cause the pixel to appear slightly reddish rather than substantially white. A repeating pattern of color occlusion by conductive lines 50 and 52 may result in the appearance of optical bands of varying color across a display.

In particular embodiments, optical bands may result in a spatially dependent variation in an optical brightness or intensity of light produced by a touch sensor-display combination. As an example and not by way of limitation, for a display configured to show a uniform white screen (e.g., red, green, and blue sub-pixels 24 of each pixel 22 are turned on so that each pixel 22 appears substantially white), optical bands may appear as alternating lighter and darker regions when viewed by a user looking at the display. In particular embodiments, intensity of a display may refer to an amount of light, brightness, radiant emittance, or optical intensity emitted by a particular region of a display. The light from a display may be produced by pixels 22 or sub-pixels 24 of the display, and intensity of a display may correspond to an amount of light per unit area emitted by a touch sensor-display combination. In the optical bands illustrated in FIGS. 10 and 11, brighter region 116 has a larger optical intensity than darker region 118. In particular embodiments, a value of intensity may have units of optical power per unit area (e.g., W/mm$^2$). As an example and not by way of limitation, a particular area of a display (e.g., brighter region 116) may produce light with an intensity of 1 μW/mm$^2$, while another area of a display (e.g., darker region 118) may produce light with an intensity of 0.9 μW/mm$^2$.

In particular embodiments, an intensity or color variation of a display may be characterized or quantified using an optical measurement instrument, such as for example, an optical power meter or a camera. In particular embodiments, an optical power meter may measure the power of light emitted from a particular area of a display. As an example and not by way of limitation, if an optical power meter with a 1-mm$^2$ aperture measures 100 nW of optical power emitted from a 1-mm$^2$ region of a display, then the intensity of that region is approximately 100 nW/mm$^2$. By translating or scanning the optical power meter across the surface of a display, measurements of intensity versus position may be made, and from this information, a map (similar to FIGS. 10-11) or a two-dimensional array of spatial variation of intensity of a display may be generated. In particular embodiments, a camera may capture an image of a display configured to show a uniformly colored screen (e.g., a uniform white, red, green, or blue screen), and the intensity or brightness of regions of the display may be determined based on the brightness of corresponding regions of the image. In particular embodiments, a uniformly white screen may be formed by configuring each red, green, and blue sub-pixel 24 of each pixel 22 to turn on so that each pixel 22 appears substantially white. In particular embodiments, a uniformly red, green, or blue screen may be formed by configuring only the red, green, or blue sub-pixels 24, respectively, to turn on with the remaining two sub-pixels 24 turned off.

In particular embodiments, optical bands may result in a spatial variation in one or more colors of light produced by a touch sensor-display combination. As an example and not by way of limitation, a display configured to show a uniform white screen may appear to have alternating regions of varying color (e.g., reddish lines superimposed over a substantially white background or alternating bluish and yellowish regions). In particular embodiments, an optical power meter with an optical filter may be used to characterize an amount of color variation across a display. As an example and not by way of limitation, an optical power meter may include three color filters (e.g., a red-pass filter, a green-pass filter, and a blue-pass filter) for measuring the intensity of light from red, green, and blue sub-pixels 24 separately. A map of color variation for each color versus location may be generated by scanning the optical power meter and filter across the display. In particular embodiments, a display may be configured to turn on each particular color sub-pixel 24 separately (e.g., red sub-pixels turned on with green and blue sub-pixels turned off) and then a power meter (e.g., a power meter without an optical filter) may measure the intensity of light from the particular color of sub-pixels 24. This measurement may be repeated for each color of sub-pixels 24, and by scanning the optical power meter across the display, a map of intensity variation for each color may be generated. In particular embodiments, a camera may capture an image of a display configured to show a uniform white screen or a screen with only one set of sub-pixels 24 turned on (e.g., green sub-pixels turned on with red and blue sub-pixels turned off), and color variation of the display may be determined by analyzing the captured image.

In particular embodiments, an intensity or color variation of a display may be quantified using software operating on a computing device where the software is operable when executed to simulate the optical characteristics of a particular mesh pattern and a particular display. As an example and not by way of limitation, a mesh pattern may be characterized, at least in part, by mesh-design parameters (e.g., $\theta_{54}$, $\theta_{56}$, $D_{70}$, or $D_{72}$) and conductive-line width 98, and a display may be characterized, at least in part, by dimensions of pixels 22 and sub-pixels 24 (e.g., the dimensions illustrated in FIG. 2). From these parameters for a mesh pattern and a display, an image or an array that represents the relative intensity or color variation of a touch sensor-display combination may be calculated using a software simulation. For example, a two-dimensional array may be generated where each element of the array includes a value that represents an intensity or color for a corresponding region of the display. Although this disclosure describes particular measurements, simulations, or calculations to characterize optical intensity or color of a display, this disclosure contemplates any suitable measurements, simulations, or calculations to characterize optical intensity or color of a display.

FIG. 10 illustrates example optical bands produced by a touch sensor-display combination where the optical bands have a periodic spatial variation in intensity that extends along optical-band axis 110. In particular embodiments, an optical-band axis 110 may be oriented substantially perpendicular to bands, lines, regions, or fringes of an optical-band pattern. In particular embodiments, a set of optical bands may exhibit a periodic (e.g., sinusoidal) spatial variation in color or intensity along axis 110. In FIG. 10, the bands of the optical-band pattern are oriented substantially perpendicular to optical-band axis 110, and the bands exhibit a repeating brighter-darker pattern of intensity variation along optical-band axis 110. In particular embodiments, an optical-band period (7) may represent a distance for a single cycle or period of an optical-band pattern along a particular optical-band axis. In particular embodiments, optical-band period T may be referred to as a spatial period. In the example of FIG. 10, optical-band period 112 ($T_L$) represents a distance along optical-band axis 110 between successive darker or lower-intensity regions of the optical-band pattern, and optical-band period 114 ($T_H$) represents a distance between successive brighter or higher-intensity regions. In particular embodiments, low-intensity optical-band period 112 may be approximately equal to high-intensity optical-band period 114, and the two periods may be referred to as an optical-band period (T) of an optical-band pattern (e.g., $T_L \cong T_H \cong T$). In particular embodiments, an optical-band frequency (f) may be defined as the inverse of an optical-band period so that f=1/T. As an example and not by way of limitation, optical bands with an optical-band period of 0.25 mm may be referred to as having an optical-band frequency of 4 mm$^{-1}$, or 4 cycles per millimeter. In particular embodiments, optical-band frequency may be referred to as beat frequency, spatial frequency, or spatial beat frequency.

FIG. 11 illustrates example optical bands having brighter and darker regions that extend along two optical-band axes 110A and 110B. In particular embodiments, an optical-band pattern may have one, two, three, or any suitable number of optical-band axes, each axis extending in any suitable direction. The optical bands in FIG. 11 exhibit a repeating brighter-darker pattern of intensity variation along both optical-band axes 110A and 110B. In the example of FIG. 11, optical-band periods 112A and 112B represent a distance between successive darker or lower-intensity regions along optical-band axes 110A and 110B, respectively. Similarly, in FIG. 11, optical-band periods 114A and 114B represent a distance between successive brighter or higher-intensity regions along optical-band axes 110A and 110B, respectively. In particular embodiments, low-intensity optical-band period 112A may be approximately equal to high-intensity optical-band period 114A, and the two periods may be referred to as a first optical-band period ($T_A$). Similarly, optical-band periods 112B and 114B may be approximately the same, and the two periods may be referred to as a second optical-band period ($T_B$). In particular embodiments, an optical-band pattern may have one, two, three, or any suitable number of optical-band periods. In particular embodiments, each optical-band period may be associated with an optical-band frequency which is the inverse of the period (e.g., $f_A=1/T_A$). As an example and not by way of limitation, in FIG. 11, the first optical-band period may be $T_A=0.33$ mm, and its corresponding optical-band frequency may be approximately $f_A=3.0$ cycles/mm. As another example and not by way of limitation, the second optical-band period may be $T_B=0.125$ mm, and its corresponding optical-band frequency may be approximately $f_B=8.0$ cycles/mm. In particular embodiments, an optical-band pattern may have one, two, three, or any suitable number of optical-band frequencies. In particular embodiments, an optical-band frequency of an optical-band pattern may be the lowest frequency of two or more optical-band frequencies associated with the optical bands. As an example and not by way of limitation, an optical-band pattern with optical-band frequencies of 3 and 8 cycles/mm may be referred to as having an optical-band frequency of 3 cycles/mm. Although this disclosure describes and illustrates particular band patterns having particular optical-band axes, particular optical-band periods, and particular optical-band frequencies, this disclosure contemplates any suitable band patterns having any suitable optical-band axes, any suitable optical-band periods, and any suitable optical-band frequencies.

In FIGS. 10-11, regions 116 and 118 represent example brighter (or, higher-intensity) and darker (or, lower-intensity) regions, respectively, of the respective optical-band patterns. In particular embodiments, brighter region 116 may represent any suitable portion of an optical-band pattern having one of the higher or highest intensities of the optical-band pattern, and darker region 118 may represent any suitable portion of an optical-band pattern having one of the lower or lowest intensities. In particular embodiments, brighter regions 116 and darker regions 118 may include an area having any suitable size (e.g., on the order of 0.05 mm$^2$, 0.1 mm$^2$, 0.5 mm$^2$, 1 mm$^2$, 2 mm$^2$, or approximately the size of a group of one or more pixels 22 or sub-pixels 24) and any suitable shape (e.g., circle, ellipse, square, rectangle, line, or the approximate shape of a group of one or more pixels 22 or sub-pixels 24). In particular embodiments, an optical-band pattern may have 1, 2, 3, 10, 50, 100, 1,000, or any suitable number of brighter regions 116 and 1, 2, 3, 10, 50, 100, 1,000, or any suitable number of darker regions 118. In particular embodiments, brighter region 116 and darker region 118 may be used to characterize a maximum optical-band intensity ($I_{max}$) and a minimum optical-band intensity ($I_{min}$), respectively, of an optical-band pattern. In particular embodiments, intensities of brighter region 116 and darker region 118 may be determined in any suitable manner, such as for example by an optical measurement instrument or a simulation of a touch sensor-display combination as described above. Although this disclosure describes and illustrates particular optical-band patterns having particular brighter and particular darker regions, this disclosure contemplates any suitable optical-band patterns having any suitable brighter and any suitable darker regions.

Figure 12:
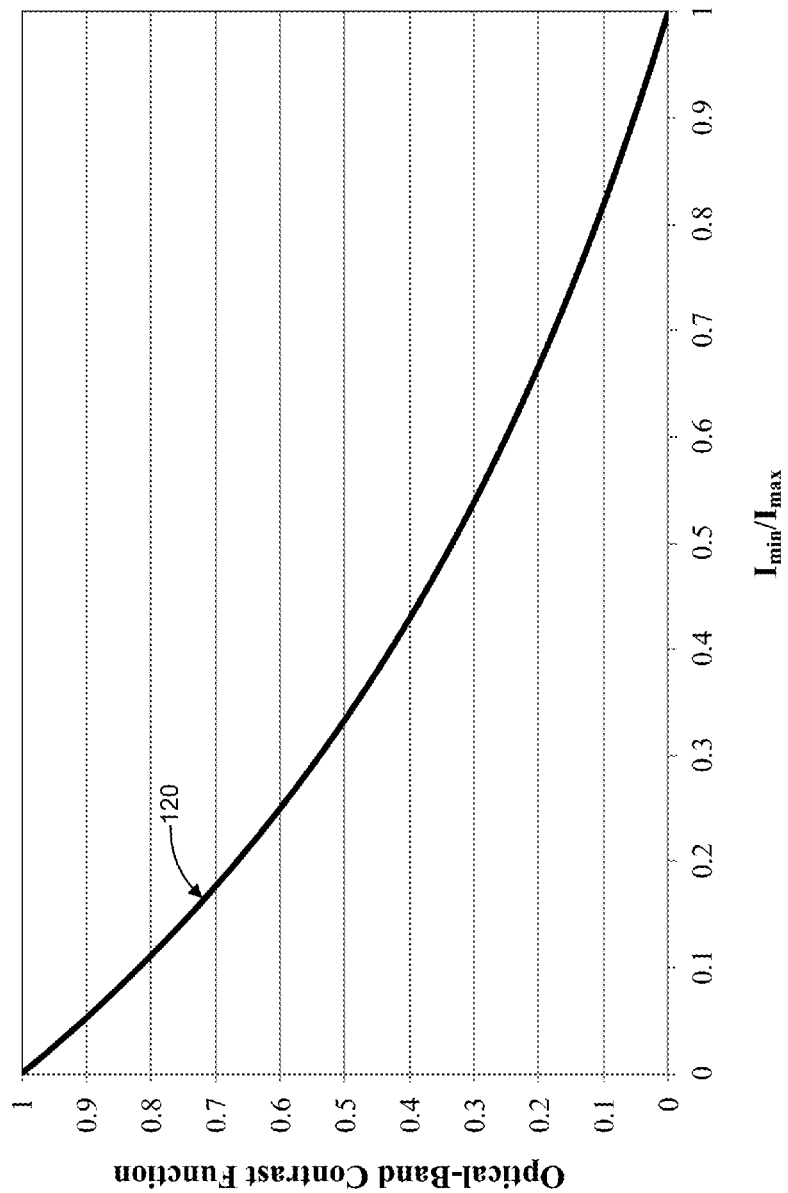
FIG. 12 illustrates a graph of an example optical-band contrast function versus the ratio of $I_{min}$ to $I_{max}$.

FIG. 12 illustrates a graph of an example optical-band contrast function versus the ratio of $I_{min}$ to $I_{max}$. Optical-band contrast represents an amount of contrast or variation in optical intensity or color of optical bands of a display resulting from a superimposition of a mesh pattern onto pixels 22 or sub-pixels 24 of the display. As illustrated in FIG. 12, an optical-band contrast function may have a value from 0 to 1 (or, 0% to 100%). An optical-band contrast function value close to zero corresponds to optical bands having a low contrast (e.g., $I_{min}$ and $I_{max}$ may be approximately equal), and an optical-band contrast function value close to one corresponds to optical bands having a high contrast (e.g., $I_{min}$ and $I_{max}$ may be substantially different). In particular embodiments, an optical-band pattern with a relatively low optical-band contrast may not be readily visible to a user, and an optical-band pattern with a relatively high optical-band contrast may be readily visible to a user. As examples and not by way of limitation, a display with an optical-band contrast of 0.04 (or, 4%) may have optical bands that may not be readily visible to a user viewing the display, while a display with an optical-band contrast of 0.9 (or, 90%) may have high-contrast optical bands that are readily visible to a user. In particular embodiments, it may be preferable to have optical bands with a low optical-band contrast function value (e.g., optical-band contrast function value less than or equal to 0.16) which corresponds to optical bands that may not be readily visible to a user viewing a display.

In particular embodiments, optical-band contrast may quantify a difference between a maximum and minimum intensity or color variation of a touch sensor-display combination. In particular embodiments, a touch sensor-display combination may have an associated optical-band contrast value that represents a contrast of the display's optical bands (e.g., to a person viewing the display). In particular embodiments, an optical-band contrast (OBC) function may be defined as $$OBC = \frac{I_{max} - I_{min}}{I_{max} + I_{min}},$$

where $I_{max}$ is a maximum optical-band intensity and $I_{min}$ is a minimum optical-band intensity. In particular embodiments, $I_{max}$ may correspond to an intensity of brighter region 116 of an optical-band pattern, and $I_{min}$ may correspond to an intensity of darker region 118. From the expression for optical-band contrast, a touch sensor-display combination with a maximum optical-band intensity of 500 nW/mm$^2$ and a minimum optical-band intensity of 490 nW/mm$^2$ has an optical-band contrast of $$OBC = \frac{500 - 490}{500 + 490} \cong 0.01,$$

or approximately 1%.

The expression for optical-band contrast function may be rewritten as $$OBC = \frac{1 - I_{min}/I_{max}}{1 + I_{min}/I_{max}},$$

which is the expression represented by optical-band contrast curve 120 in FIG. 12. The horizontal axis in FIG. 12 represents $I_{min}/I_{max}$, the ratio of $I_{min}$ to $I_{max}$, and the vertical axis represents the optical-band contrast function. Optical-band contrast may be a value from 0 to 1, which may also be expressed as a value from 0% to 100%. In particular embodiments, an optical-band contrast function may decrease monotonically from 1 to 0 as the ratio $I_{min}/I_{max}$ increases from 0 to 1. An optical-band contrast of 0 (or, 0%) represents a touch sensor-display combination where no optical bands are visible or discernable (e.g., a uniform white display), and an optical-band contrast of 1 (or, 100%) represents a case where the optical bands have maximum contrast or visibility (e.g., alternating black and white bands). As illustrated in the example of FIG. 12, for low values of $I_{min}/I_{max}$ (e.g., $I_{min}$ and $I_{max}$ may be substantially different), the optical-band contrast is relatively high, and for high values of $I_{min}/I_{max}$ (e.g., $I_{min}$ and $I_{max}$ may be approximately equal), the optical-band contrast is relatively low. As examples and not by way of limitation, for $I_{min}/I_{max}=0.1$, the optical-band contrast is approximately 0.82 (or, 82%), and for $I_{min}/I_{max}=0.9$, the optical-band contrast is approximately 0.053 (or, 5.3%). As the difference between $I_{max}$ and $I_{min}$ increases, the ratio $I_{min}/I_{max}$ approaches zero, and the value of optical-band contrast increases. In particular embodiments, it may be preferable for a touch sensor-display combination to have optical bands with a ratio of $I_{min}$ to $I_{max}$ that is greater than or equal to approximately 0.68, 0.72, 0.82, 0.9, or greater than any suitable value. In particular embodiments, it may be preferable for a touch sensor-display combination to have optical bands with an optical-band contrast function value that is less than or equal to approximately 0.2, 0.16, 0.1, 0.05, or less than any suitable optical-band contrast function value. As an example and not by way of limitation, it may be preferable to a touch sensor-display combination to have a value for $I_{min}/I_{max}$ that is greater than 0.72, which corresponds to an optical-band contrast function value that is less than 0.16. Although this disclosure describes and illustrates particular optical-band contrast functions, this disclosure contemplates any suitable optical-band contrast functions.

In particular embodiments, a user's eye may not be able to readily discern or resolve details of an optical-band pattern of a display when the optical-band pattern has an optical-band frequency above a particular spatial frequency. In particular embodiments, it may be preferable for a touch sensor-display combination to exhibit an optical-band pattern with an optical-band frequency (f) of greater than or equal to approximately 2 cycles/mm, 3 cycles/mm, 4 cycles/mm, or greater than or equal to any suitable optical-band frequency value. As an example and not by way of limitation, a touch sensor-display combination may have an optical-band pattern, such as for example the optical-band pattern of FIG. 10, with an optical-band frequency of 4 cycles/mm, and due to the relatively high optical-band frequency, the optical-band pattern may not be readily discernable by or perceptible to a user viewing the touch sensor-display combination. In particular embodiments, an optical-band pattern may include two or more optical-band frequencies (such as for example the optical-band pattern of FIG. 11), and each of the two or more optical-band frequencies may be greater than a particular optical-band frequency value (e.g., each optical-band frequency may be greater than 2 cycles/mm). In particular embodiments, since, as described above, optical-band frequency (f) is the inverse of optical-band period (T), it may be preferable for a touch sensor-display combination to exhibit an optical-band pattern with an optical-band period that is less than or equal to approximately 0.5 mm, 0.33 mm, 0.25 mm, or less than or equal to any suitable optical-band period value. In particular embodiments, one or more of the mesh designs described herein, listed in TABLE 1, or illustrated by any of FIGS. 4 and 6-9, may reduce the resolvability of repeating patterns between conductive lines 50 and 52 of a mesh pattern and pixels 22 or sub-pixels 24 of a display by increasing the optical-band frequency (or, decreasing the spatial period) of one or more moiré patterns associated with the mesh pattern and display. As an example and not by way of limitation, one or more sets of mesh-design parameters listed in TABLE 1 above may correspond to mesh designs having an optical-band frequency value that makes it difficult for a user to discern or resolve details of an associated optical-band pattern. Although this disclosure describes and illustrates particular optical bands having particular optical-band frequency values, this disclosure contemplates any suitable optical bands having any suitable optical-band frequency values.

Figure 13:
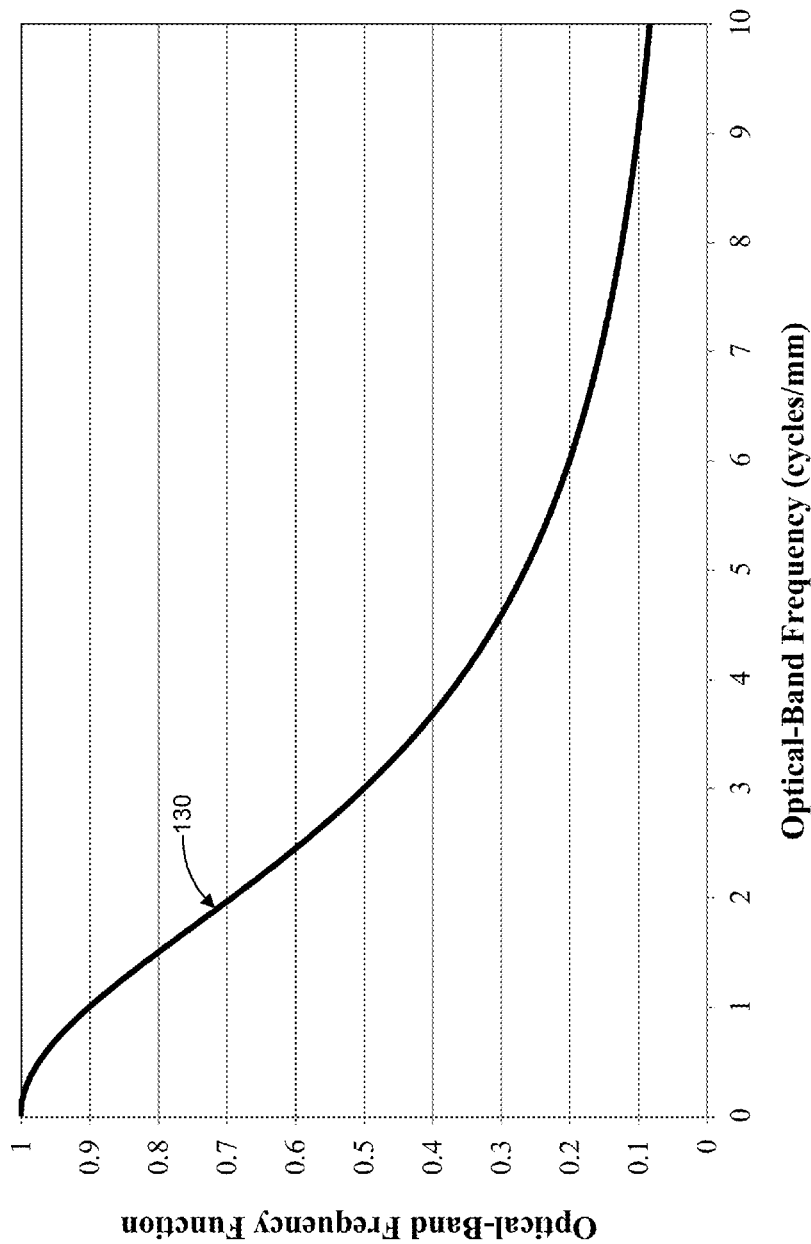
FIG. 13 illustrates a graph of an example optical-band frequency function versus optical-band frequency.

FIG. 13 illustrates a graph of an example optical-band frequency function versus optical-band frequency. In particular embodiments, a value of an optical-band frequency function may be associated with an optical-band frequency of an optical-band pattern. As illustrated in FIG. 13, an optical-band frequency function may have a value from 0 to 1 (or, 0% to 100%). An optical-band frequency function with a value close to one corresponds to optical bands having a relatively low optical-band frequency, and an optical-band frequency function with a value close to zero corresponds to optical bands having a relatively high optical-band frequency. In particular embodiments, an optical-band pattern with a relatively low value for an optical-band frequency function may not be readily discernible or resolvable to a user, and an optical-band pattern with a relatively high value of an optical-band frequency function may be readily discernible or resolvable to a user. As examples and not by way of limitation, a display with an optical-band frequency function value of 0.1 (or, 10%) may have relatively high-frequency optical bands that may not be readily discernible to a user viewing the display, while a display with an optical-band frequency function value of 0.9 (or, 90%) may have relatively low-frequency optical bands that may be readily discernible to a user. In particular embodiments, it may be preferable to have optical bands with a low value for an optical-band frequency function (e.g., optical-band frequency function less than or equal to 0.7) which may correspond to optical bands that may not be readily discernible or resolvable to a user viewing a display.

In particular embodiments, an optical-band frequency (OBF) function may be defined as $$OBF = \frac{1}{1 + (f/K)^n},$$

where f is an optical-band frequency of the optical bands, K is a constant, and n is a constant. For the example optical-band frequency function represented by curve 130 in FIG. 13, f has units of cycles per millimeter, K is 3 cycles per millimeter, n is 2, and the optical-band frequency function is $$OBF = \frac{1}{1 + (f/3)^2}.$$

For these parameters, an optical-band pattern with an optical-band frequency of 3 cycles/mm has a value for optical-band frequency function of 0.5, while a pattern with an optical-band frequency of 8 cycles/mm has a value for optical-band frequency function of approximately 0.12. In other particular embodiments, an optical-band frequency function may be defined as $$OBF = \frac{1}{1 + e^{m(f-f_0)}},$$

where f is an optical-band frequency of the optical bands, and m and $f_0$ are constants. In particular embodiments, an optical-band frequency function may decrease monotonically from 1 to 0 as the optical-band frequency increases from 0 to infinity. In particular embodiments, it may be preferable for a touch sensor-display combination to have optical bands with a value for an optical-band frequency function of less than or equal to 0.7, 0.5, 0.3, 0.2, or less than any suitable optical-band frequency function value. In particular embodiments, an optical-band frequency function may be determined based on a minimum of two or more optical-band frequencies associated with an optical-band pattern. As an example and not by way of limitation, if an optical-band pattern has two optical-band frequencies (e.g., as illustrated in FIG. 11), an optical-band frequency function may be determined based on the lower of the two optical band frequencies. Although this disclosure describes and illustrates particular optical-band frequency functions, this disclosure contemplates any suitable optical-band frequency functions.

In particular embodiments, angles 54 ($\theta_{54}$) and 56 ($\theta_{56}$) and separation distances 70 ($D_{70}$) and 72 ($D_{72}$) of a mesh design may collectively form optical bands with respect to a display, where the optical bands have an optical-band visibility V that is a product of an optical-band contrast function and an optical-band frequency function. As an example and not by way of limitation, an optical-band visibility may be defined as V=OBC×OBF so that $$V = \frac{I_{max} - I_{min}}{I_{max} + I_{min}} \times \frac{1}{1 + (f/K)^n}.$$

As another example and not by way of limitation, an optical-band visibility may be defined as $$V = \frac{I_{max} - I_{min}}{I_{max} + I_{min}} \times \frac{1}{1 + e^{m(f-f_0)}}.$$

As examples and not by way of limitation, a mesh pattern in combination with a display may exhibit an optical-band visibility of approximately 0.02, 0.05, 0.1, or any suitable visibility value. These example values of visibility may also be expressed as 2% visibility, 5% visibility, and 10% visibility, respectively. In particular embodiments, it may be preferable for a touch sensor-display combination to exhibit an optical-band visibility of less than or equal to approximately 0.14, 0.11, 0.08, 0.05, or less than or equal to any suitable visibility value. As an example and not by way of limitation, a touch sensor-display combination with an optical-band visibility of 0.11 may exhibit an optical-band pattern that is not readily discernable by or perceptible to a user viewing the touch sensor-display combination.

In particular embodiments, certain touch-sensor mesh designs, such as for example, one or more of the mesh designs described herein, listed in TABLE 1, or illustrated by any of FIGS. 4 and 6-9, may exhibit relatively low visibility values (e.g., V≤0.11) and a correspondingly low amount of intensity or color variation associated with moiré-pattern effects. In particular embodiments, one or more of the mesh designs described herein, listed in TABLE 1, or illustrated by any of FIGS. 4 and 6-9, may reduce the visibility of repeating patterns between conductive lines 50 and 52 of a mesh pattern and pixels 22 or sub-pixels 24 of a display by reducing the amplitude of one or more moiré patterns associated with the mesh pattern and display. In particular embodiments, a reduction of moiré-pattern effects associated with a touch-sensor mesh pattern may be referred to as an improvement in optical performance of the mesh pattern. Although this disclosure describes and illustrates particular optical bands having particular visibility values, this disclosure contemplates any suitable optical bands having any suitable visibility values.

Figure 14:
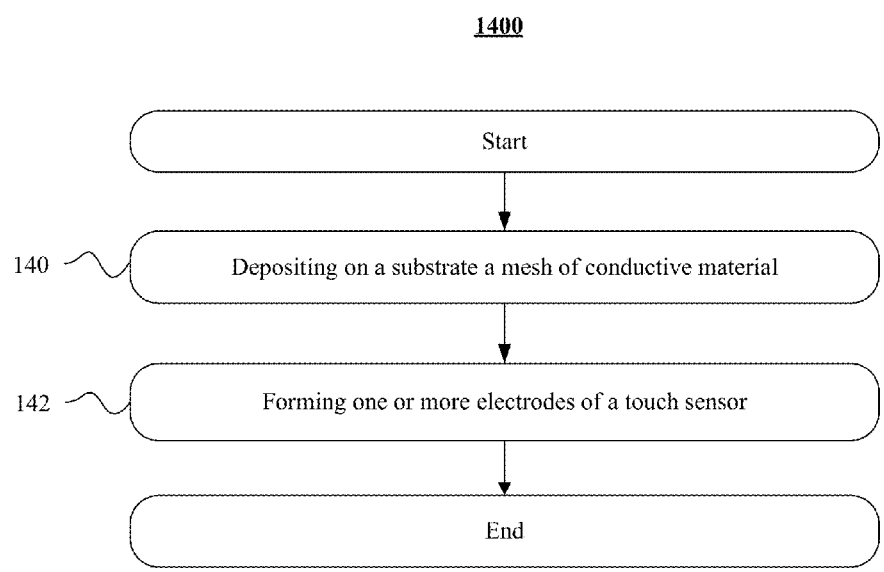
FIG. 14 illustrates an example method for forming one or more electrodes of a touch sensor.

FIG. 14 illustrates an example method 1400 for forming one or more electrodes of a touch sensor. The method may start at step 140 where a mesh of conductive material is deposited on a substrate. This disclosure contemplates any suitable technique for depositing a mesh of conductive material on a substrate, such as for example, printing of a mesh onto a substrate, evaporation, sputtering, physical vapor deposition, or chemical vapor deposition. In particular embodiments, the mesh of conductive material may be configured to extend across a display that includes multiple pixels 22. In particular embodiments, the mesh may include first lines of conductive material 50 that are substantially parallel to each other and second lines of conductive material 52 that are substantially parallel to each other. In particular embodiments, the first and second lines may be configured to extend across the display at first and second angles 54 and 56, respectively, where the angles may be determined in any suitable manner, such as for example, by any of the above-described manners. In particular embodiments, the first and second lines may each have respective separation distances 70 and 72 that are determined in any suitable manner, such as for example, by any of the above-described manners. At step 142, one or more electrodes of a touch sensor may be formed from the mesh of conductive material, at which point the method may end. This disclosure contemplates any suitable technique for forming electrodes from a mesh of conductive material, such as for example, by etching, cutting, or ablating to remove one or more portions of the mesh of conductive material. Although this disclosure describes and illustrates particular steps of the method of FIG. 14 as occurring in a particular order, this disclosure contemplates any suitable steps of the method of FIG. 14 occurring in any suitable order. Particular embodiments may repeat one or more steps of the method of FIG. 14, where appropriate. Moreover, although this disclosure describes and illustrates an example method for forming electrodes of a touch sensor including the particular steps of the method of FIG. 14, this disclosure contemplates any suitable method for forming electrodes of a touch sensor including any suitable steps, which may include all, some, or none of the steps of the method of FIG. 14, where appropriate. Moreover, although this disclosure describes and illustrates particular components carrying out particular steps of the method of FIG. 14, this disclosure contemplates any suitable combination of any suitable components carrying out any suitable steps of the method of FIG. 14.

Figure 15:
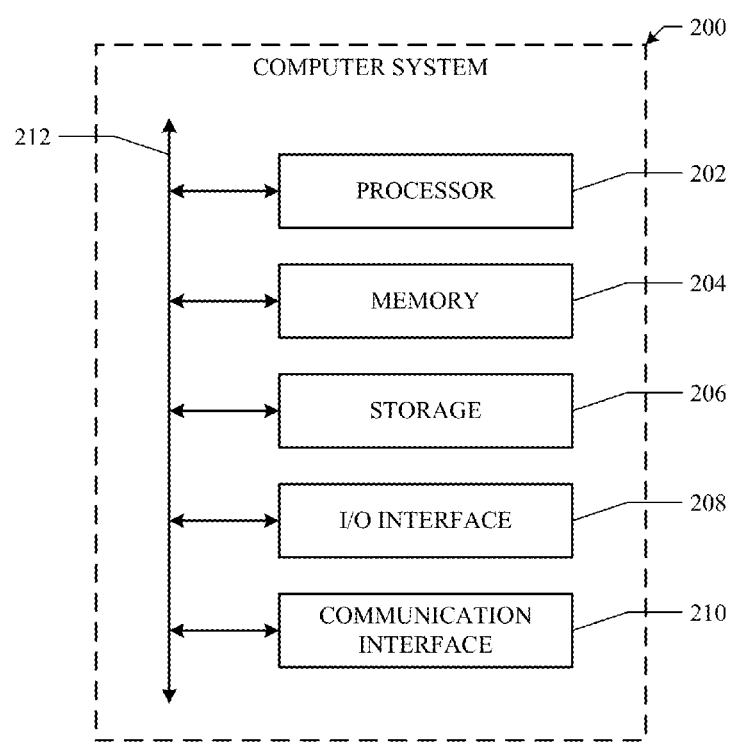
FIG. 15 illustrates an example computer system.

FIG. 15 illustrates an example computer system 200. In particular embodiments, one or more computer systems 200 perform one or more steps of one or more methods described or illustrated herein. In particular embodiments, one or more computer systems 200 provide functionality described or illustrated herein. In particular embodiments, software running on one or more computer systems 200 performs one or more steps of one or more methods described or illustrated herein or provides functionality described or illustrated herein. Particular embodiments include one or more portions of one or more computer systems 200. Herein, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

In particular embodiments, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between computer system 200 and one or more other computer systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of computer system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus that comprises:
   a touch sensor that comprises a mesh of conductive material configured to extend across a display, wherein:
   the mesh comprises first lines of conductive material that are substantially parallel to each other and second lines of conductive material that are substantially parallel to each other;
   the first lines extend across the display at a first angle relative to a first axis;
   the second lines extend across the display at a second angle relative to the first axis;

first lines that are adjacent to each other are separated from each other along the first axis by a first separation distance;
second lines that are adjacent to each other are separated from each other along the first axis by a second separation distance;
the first and second angles of the first and second lines and the first and second separation distances of adjacent ones of the first and second lines collectively form optical bands with respect to the display that have an optical-band visibility that is a product of an optical-band contrast function and an optical-band frequency function;
the optical-band contrast function is $$\frac{I_{max} - I_{min}}{I_{max} + I_{min}},$$

wherein $I_{max}$ is a maximum optical-band intensity and $I_{min}$ is a minimum optical-band intensity;
the optical-band frequency function is $$\frac{1}{1 + (f/K)^n},$$

wherein f is an optical-band frequency of the optical bands, K is a constant, and n is a constant; and
the optical-band visibility of the optical bands is less than or equal to 0.11; and
one or more computer-readable non-transitory storage media coupled to the touch sensor and embodying logic that is configured when executed to control the touch sensor.

2. The apparatus of claim 1, wherein:
f has units of cycles per millimeter;
K is 3 cycles per millimeter;
n is 2; and
the optical-band frequency function is $$\frac{1}{1 + (f/3)^2}.$$

3. The apparatus of claim 1, wherein the optical-band frequency of the optical bands is greater than or equal to 2 cycles per millimeter.

4. The apparatus of claim 1, wherein the optical-band frequency of the optical bands is a lowest frequency of two or more optical-band frequencies associated with the optical bands.

5. The apparatus of claim 1, wherein the optical-band contrast function for the optical bands has a value less than or equal to 0.16.

6. The apparatus of claim 1, wherein the optical-band frequency function for the optical bands has a value less than or equal to 0.7.

7. The apparatus of claim 1, wherein:
the display comprises a plurality of pixels, wherein:
each of the pixels has a first pixel pitch ($PP_x$) along the first axis and a second pixel pitch ($PP_y$) along a second axis that is substantially perpendicular to the first axis;
the first pixel pitch is a distance between corresponding features of two adjacent pixels along the first axis; and
the second pixel pitch is a distance between corresponding features of two adjacent pixels along the second axis;
the first angle is within 1° of the arctangent of $$\left[\frac{3}{m} \times \frac{PP_y}{PP_x}\right],$$

wherein m is an integer; and
the second angle is within 1° of the arctangent of $$\left[\frac{3}{n} \times \frac{PP_y}{PP_x}\right],$$

wherein n is an integer.

8. The apparatus of claim 7, wherein:
the first pixel pitch is approximately equal to the second pixel pitch;
m is equal to 5;
the first angle is within 1° of 30.96°;
n is equal to 2; and
the second angle is within 1° of 56.31°.

9. The apparatus of claim 7, wherein:
the first pixel pitch is approximately equal to the second pixel pitch;
m is equal to 4;
the first angle is within 1° of 36.87°;
n is equal to 2; and
the second angle is within 1° of 56.31°.

10. The apparatus of claim 1, wherein:
the display comprises a plurality of pixels, wherein each of the pixels has a first pixel pitch ($PP_x$) along the first axis, the first pixel pitch being a distance between corresponding features of two adjacent pixels along the first axis;
the first separation distance is within 1% of $$\left(\frac{p}{3 \times q} \times PP_x\right),$$

wherein p and q are integers; and
the second separation distance is within 1% of $$\left(\frac{r}{3 \times s} \times PP_x\right),$$

wherein r and s are integers.

11. The apparatus of claim 10, wherein:
p is equal to 12;
q is equal to 1;
the first separation distance is within 1% of $4 \times PP_x$;
r is equal to 10;
s is equal to 1; and
the second separation distance is within 1% of $$\frac{10}{3} \times PP_x.$$

12. The apparatus of claim 10, wherein:
p is equal to 9;
q is equal to 1;
the first separation distance is within 1% of $3 \times PP_x$;
r is equal to 14;
s is equal to 3; and
the second separation distance is within 1% of $$\frac{14}{9} \times PP_x.$$

13. The apparatus of claim 10, wherein:
p is equal to 31;
q is equal to 2;
the first separation distance is within 1% of $$\frac{31}{6} \times PP_x;$$

r is equal to 17;
s is equal to 2; and
the second separation distance is within 1% of $$\frac{17}{6} \times PP_x.$$

14. The apparatus of claim 10, wherein:
p is equal to 41;
q is equal to 6;
the first separation distance is within 1% of $$\frac{41}{18} \times PP_x;$$

r is equal to 14;
s is equal to 3; and
the second separation distance is within 1% of $$\frac{14}{9} \times PP_x.$$

15. The apparatus of claim 1, wherein the first and second lines of conductive material each have a width between approximately 2.5 μm and 3.5 μm.

16. The apparatus of claim 1, wherein the first and second lines of conductive material each have a width between approximately 4.5 μm and 5.5 μm.

17. The apparatus of claim 1, wherein the first and second lines of conductive material form a plurality of mesh cells, each mesh cell having a diagonal length of approximately 265 μm to 340 μm.

18. A touch sensor that comprises:
a mesh of conductive material configured to extend across a display, wherein:
the mesh comprises first lines of conductive material that are substantially parallel to each other and second lines of conductive material that are substantially parallel to each other;
the first lines extend across the display at a first angle relative to a first axis;
the second lines extend across the display at a second angle relative to the first axis;
first lines that are adjacent to each other are separated from each other along the first axis by a first separation distance;
second lines that are adjacent to each other are separated from each other along the first axis by a second separation distance;
the first and second angles of the first and second lines and the first and second separation distances of adjacent ones of the first and second lines collectively form optical bands with respect to the display that have an optical-band visibility that is a product of an optical-band contrast function and an optical-band frequency function;
the optical-band contrast function is $$\frac{I_{max} - I_{min}}{I_{max} + I_{min}},$$

wherein $I_{max}$ is a maximum optical-band intensity and $I_{min}$ is a minimum optical-band intensity;
the optical-band frequency function is $$\frac{1}{1 + (f/K)^n},$$

wherein f is an optical-band frequency of the optical bands, K is a constant, and n is a constant; and
the optical-band visibility of the optical bands is less than or equal to 0.11.

19. The touch sensor of claim 18, wherein the optical-band frequency of the optical bands is greater than or equal to 2 cycles per millimeter.

20. A method comprising:
depositing on a substrate a mesh of conductive material configured to extend across a display, wherein:
the mesh comprises first lines of conductive material that are substantially parallel to each other and second lines of conductive material that are substantially parallel to each other;
the first lines extend across the display at a first angle relative to a first axis;
the second lines extend across the display at a second angle relative to the first axis;
first lines that are adjacent to each other are separated from each other along the first axis by a first separation distance;
second lines that are adjacent to each other are separated from each other along the first axis by a second separation distance;
the first and second angles of the first and second lines and the first and second separation distances of adjacent ones of the first and second lines collectively form optical bands with respect to the display that have an optical-band visibility that is a product of an optical-band contrast function and an optical-band frequency function;

the optical-band contrast function is $$\frac{I_{max} - I_{min}}{I_{max} + I_{min}},$$

wherein $I_{max}$ is a maximum optical-band intensity and $I_{min}$ is a minimum optical-band intensity;
the optical-band frequency function is $$\frac{1}{1+(f/K)^n},$$

wherein d is an optical-Dana frequency of the optical bands, K is a constant, and n is a constant; and
the optical-band visibility of the optical bands is less than or equal to 0.11; and
forming one or more electrodes of a touch sensor from the mesh of conductive material.

* * * * *